(12) United States Patent
Watabe et al.

(10) Patent No.: US 10,214,247 B2
(45) Date of Patent: Feb. 26, 2019

(54) WORK VEHICLE

(71) Applicant: Yanmar Co., Ltd., Osaka-shi, Osaka-fu (JP)

(72) Inventors: Kenji Watabe, Osaka (JP); Daisuke Takii, Osaka (JP); Yoshiferu Oshige, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 15/769,681

(22) PCT Filed: Sep. 2, 2016

(86) PCT No.: PCT/JP2016/004006
§ 371 (c)(1),
(2) Date: Apr. 19, 2018

(87) PCT Pub. No.: WO2017/068745
PCT Pub. Date: Apr. 27, 2017

(65) Prior Publication Data
US 2018/0304936 A1 Oct. 25, 2018

(30) Foreign Application Priority Data
Oct. 20, 2015 (JP) .................................. 2015-206724

(51) Int. Cl.
*B60K 11/02* (2006.01)
*B60K 11/06* (2006.01)
(Continued)

(52) U.S. Cl.
CPC .............. *B62D 25/12* (2013.01); *B60K 11/00* (2013.01); *B60K 11/08* (2013.01); *B60K 13/04* (2013.01); *F01P 5/06* (2013.01); *B62D 49/06* (2013.01)

(58) Field of Classification Search
CPC .......... B60K 11/02; B60K 11/06; B60K 11/08; B60K 13/04; B60K 15/063; E02F 3/32; Y02T 10/24
See application file for complete search history.

(56) References Cited

U.S. PATENT DOCUMENTS 5,718,303 A * 2/1998 Ogasawara ............ B62D 25/10
180/69.21
5,782,312 A * 7/1998 Murakawa ............. B60K 11/08
180/68.1
(Continued)

FOREIGN PATENT DOCUMENTS

JP 63-270230 A 11/1988
JP 1990-065617 U1 5/1990
(Continued)

OTHER PUBLICATIONS

International Search Report dated Nov. 15, 2016 issued in corresponding PCT Application PCT/JP2016/004006.

*Primary Examiner* — Bryan A Evans
(74) *Attorney, Agent, or Firm* — Norton Rose Fulbright US LLP

(57) ABSTRACT

A work vehicle such as a tractor including a cooling fan (12*a*) arranged in front of the vehicle's engine main body (1), and is configured to feed air to the engine main body. The work vehicle further includes a DPF (19), which is arranged on one side of the engine main body and purifies exhaust gas exhausted from the engine main body, and an engine hood (7), which covers the engine main body, the cooling fan, and the DPF. An outside air intake port (21) is formed in both side surfaces of the engine hood at a position further forward than the cooling fan. On both side surfaces of the engine hood, a first opening (30) capable of exhausting air inside the engine hood in a direction away from the vehicle's operation seat in side view is formed in a position facing the DPF in the lateral direction.

4 Claims, 20 Drawing Sheets

(51) Int. Cl.
*B60K 11/08* (2006.01)
*B60K 13/04* (2006.01)
*B62D 25/12* (2006.01)
*F01P 5/06* (2006.01)
*B60K 11/00* (2006.01)
B62D 49/06 (2006.01)

(56) References Cited

U.S. PATENT DOCUMENTS

| | | | | |
|---|---|---|---|---|
| 6,082,477 | A * | 7/2000 | Murakawa | B60K 11/08 180/69.21 |
| 8,347,994 | B2 * | 1/2013 | Bering | B60K 11/08 180/68.1 |
| 2012/0261202 | A1 * | 10/2012 | Bering | F01P 5/06 180/68.1 |
| 2014/0251713 | A1 * | 9/2014 | Aoyama | B60K 13/04 180/309 |

FOREIGN PATENT DOCUMENTS

| | | | |
|---|---|---|---|
| JP | 08-042340 | A | 2/1996 |
| JP | 2002-079957 | A | 3/2002 |
| JP | 2002079957 | A * | 3/2002 |
| JP | 2006-117005 | A | 5/2006 |
| JP | 2013-112283 | A | 6/2013 |
| JP | 2014-066217 | A | 4/2014 |
| WO | 2014/200021 | A1 | 12/2014 |

* cited by examiner

WORK VEHICLE

CROSS REFERENCES TO RELATED APPLICATIONS

This application is a national stage application pursuant to 35 U.S.C. § 371 of International Application No. PCT/JP 2016/004006, filed on Sep. 2, 2016, which claims priority under 35 U.S.C. § 119 to Japanese Patent Application No. 2015-206724, filed on Oct. 20, 2015, the disclosures of which are hereby incorporated by reference in their entireties.

TECHNICAL FIELD

The present disclosure relates to a work vehicle. More specifically, the present disclosure relates to a work vehicle having an engine hood.

BACKGROUND ART

Traditionally, in a work vehicle having an engine hood, there have been suggested various structures which favorably radiates heat generated in the engine hood. Patent literature 1 (hereinafter, PTL 1) discloses a work vehicle of this kind. The work vehicle of PTL 1 has a structure including an engine main body, an exhaust gas purification device, an engine hood, and an operation seat.

In the disclosure of such a work vehicle of PTL 1, the engine main body is mounted in a front portion of the traveling body. The exhaust gas purification device is a device for purifying exhaust gas output from the engine main body, and is mounted on an upper portion side of the engine main body. The engine hood covers the engine main body and the exhaust gas purification device. The operation seat is arranged behind the engine hood. The engine hood has an opening hole on its front side and at least one of left and right sides. In the work vehicle of this PTL 1, outside air is taken into the engine hood from the front side of the traveling body relative to a traveling direction through this opening hole. Further, after the engine is stopped and the like, heat generated from the exhaust gas purification device is dissipated to the outside the engine hood through the opening hole.

CITATION LIST

Patent Literature

PTL 1: International Publication No. 2014/200021

SUMMARY OF INVENTION

Technical Problem

However, in the structure of the above PTL 1 for dissipating to the outside the heat generated by the exhaust gas purification device through the opening hole, the heat is not sufficiently dissipated due to failure in taking in sufficient amount of air from the front side of the engine hood in some cases. More specifically, a front grill for taking outside air therethrough is provided on the front side of the engine hood in general. However, there are cases where the outside air introduced through this front grill fall short for sufficiently cooling inside the engine hood. Further, due to insufficient cooling effect inside the engine hood, the air exhausted from the opening hole is also at a high temperature, and this high temperature air exhausted partially flows towards the operation seat and deteriorates a work environment nearby the operation seat.

The present invention has been made in view of the above circumstances, and a potential object thereof is to improve a cooling effect in the engine hood and improve the work environment nearby the operation seat.

Solution to Problem and Advantages

Problems to be solved by the invention are as described above, and next, means for solving the problems and effects thereof will be described.

In an aspect of the present invention, a work vehicle having the following structure is provided. Namely, the work vehicle includes an engine main body, a cooling fan, an exhaust gas purification device, an engine hood, and an operation seat. The cooling fan is arranged in front of the engine main body, and is configured to feed air to the engine main body. The exhaust gas purification device is arranged on one of the left and right sides of the engine main body, and is configured to purify exhaust gas exhausted from the engine main body. The engine hood covers the engine main body, the cooling fan, and the exhaust gas purification device. The operation seat is arranged behind the engine hood. An outside air intake port is formed in at least one of left and right side surfaces of the engine hood, at a position further forward than the cooling fan. Further, on at least one of the left and right side surfaces of the engine hood, a first opening capable of exhausting air inside the engine hood in a direction away from the operation seat in side view is formed in a position facing the exhaust gas purification device in the lateral direction. On the other hand, a second opening having a shape elongated in a vehicle width direction, which is capable of exhausting the air inside the engine hood in a direction away from the operation seat in side view, is formed in a position above the rear of the engine hood and in front of the operation seat. Further, a closing part is provided in a middle position of the second opening relative to the vehicle width direction.

With this, the air taken into the engine hood through the outside air intake port is fed rearward by the cooling fan, and flows along the left and right side surfaces of the engine main body and the exhaust gas purification device. Therefore, the exhaust gas purification device which tends to have a high temperature can be efficiently cooled. Further, the air having become high temperature air by taking away the heat from the exhaust gas purification device is exhausted outside the engine hood from the first opening, in a direction away from the operation seat. Thus, the air having become high temperature is restrained from flowing towards the operation seat behind, and a favorable work environment nearby the operation seat can be maintained. At this time, an amount of the air which became high temperature air by taking away the heat from the engine main body and the exhaust gas purification device, and which is not exhausted outside the engine hood from the first opening can be exhausted outside the engine hood from the second opening, in a direction away from the operation seat. Therefore, accumulation of heat inside the engine hood can be restrained, the cooling effect can be further improved, and a favorable work environment nearby the operation seat can be maintained. Further, the direction of the air passing through the second opening is divided into left and right by the closing part. Therefore, the heated air is blown out from areas (left and right sides) of the second opening, excluding the middle portion thereof. Therefore, even when the high temperature air from the second opening flows rearward, it is possible to restrain the air from flowing to the operation seat.

The work vehicle is preferably such that a plurality of first fins, each having a surface inclined in such a manner as to be further forward as it gets closer to the outside from inside the engine hood, are arranged and aligned in the first opening.

With this structure, the air having become high temperature air by taking away the heat from the exhaust gas purification device is exhausted in such a manner as to approach the front of the work vehicle as it gets away from the first opening, by passing the first opening along the surfaces of the first fins. Thus, the air having become high temperature is reliably restrained from flowing towards the operation seat behind, and a favorable work environment nearby the operation seat can be maintained.

The work vehicle is preferably such that a plurality of second fins, each having a surface inclined in such a manner as to be further forward as it gets closer to the outside from a middle relative to the vehicle width direction, are arranged and aligned in the second opening.

With this structure, an amount of the air which became high temperature air by taking away the heat from the engine main body and the exhaust gas purification device, and which is not exhausted outside the engine hood from the first opening passes the second opening along the surfaces of the second fins and is exhausted towards the front of the work vehicle, and towards the outside so as to depart from the work vehicle in the vehicle width direction. Therefore, the work environment nearby the operation seat is further improved.

DESCRIPTION OF EMBODIMENT

An embodiment of the present disclosure will be described with reference to the drawings. In the following description, the wordings "left", "right", and the like mean the left and the right in the direction in which the tractor 6 (work vehicle) moves forward, respectively.

Figure 1:
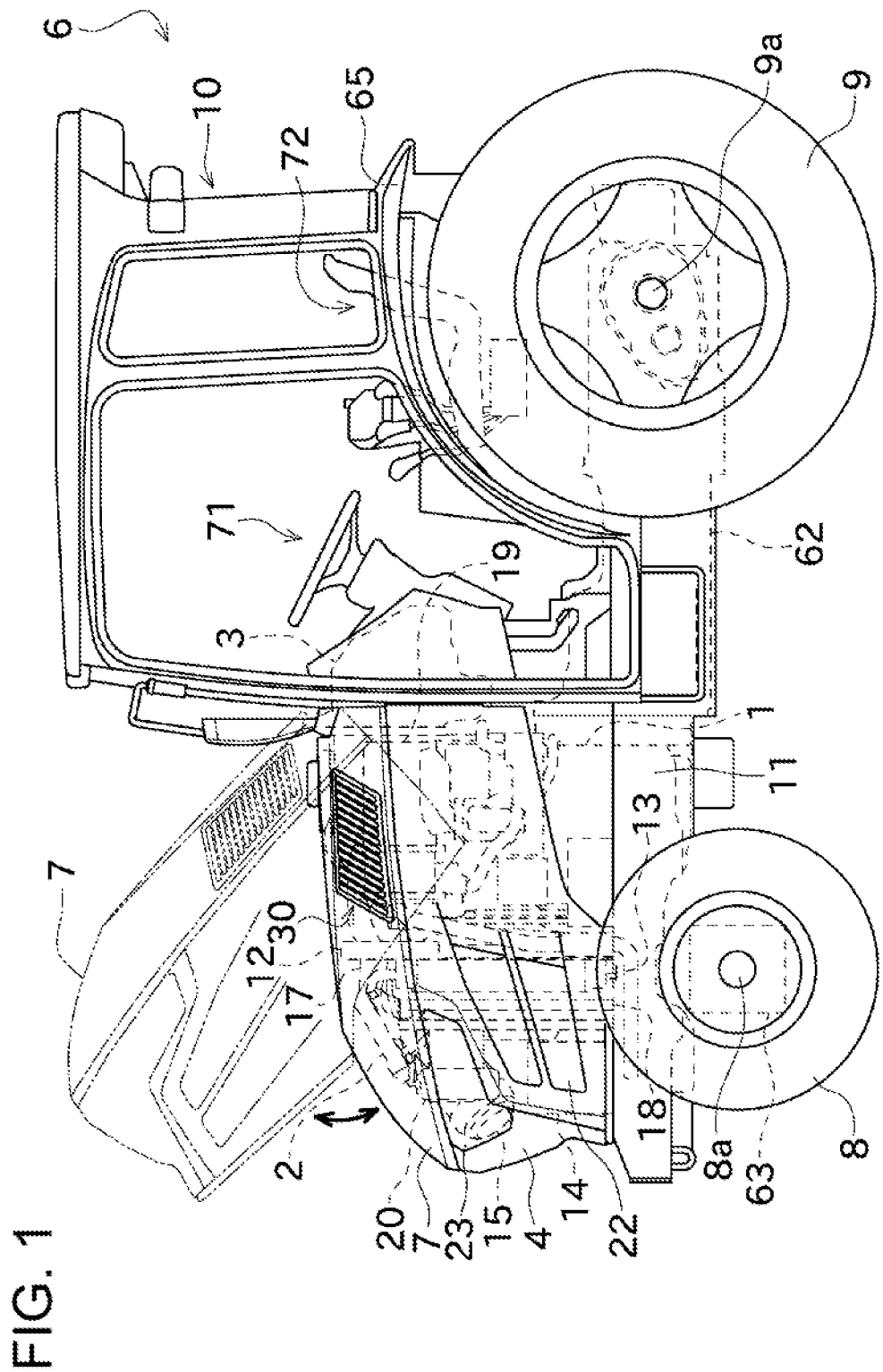
FIG. 1 A right side view showing an overall structure of a tractor related to one embodiment of the present disclosure.

The tractor 6 as a work vehicle shown in FIG. 1 is structured to be able to perform various types of work by mounting various work machine such as a plow, a halo, a loader, and the like, according to the need. The tractor 6 has front wheels 8 on its front portion and rear wheels 9 on its rear portion.

An engine hood 7 is disposed in the front portion of the tractor 6, and an engine room is structured inside this engine hood 7. The engine hood 7 can be opened and closed by rotating about its rear end portion as a fulcrum. Opening the engine hood 7 allows an operator to access the engine room. The engine hood 7 is structured in a stream-line shape, and the front portion thereof is formed so as to be thinned relative to the vertical direction (up-down direction) and the lateral direction (left-right direction) as it gets forward (i.e., tapered shape). This shape achieves reduction of air resistance during traveling and improvement of designability.

Figure 2:
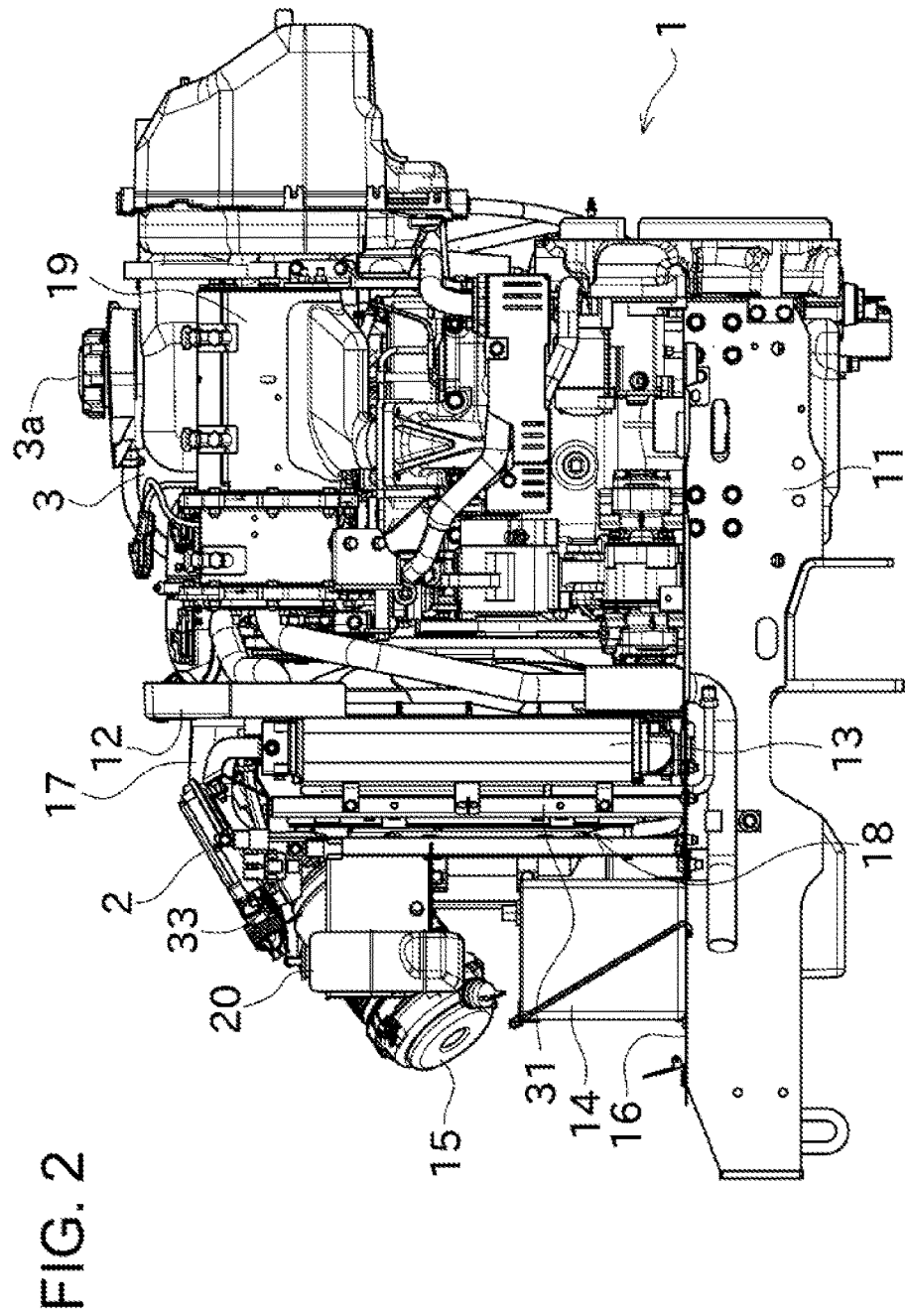
FIG. 2 A right side view showing a state inside an engine hood.

As shown in FIG. 2, an engine main body 1 is accommodated in the engine room inside the engine hood 7. The engine main body 1 is supported by an engine frame 11 provided to the tractor 6, directly or through a vibration isolation member and the like.

The engine main body 1 is structured as a common-rail diesel engine having a plurality of cylinders. Specifically, the engine main body 1 is provided with a not-shown common-rail which stores fuel at high pressure. The fuel supplied from the common-rail is injected into a combustion chamber by a not-shown injector disposed in each cylinder.

As shown in FIG. 1, a cabin 10 for an operator to board is disposed behind the engine hood 7. Inside this cabin 10, an operation unit 71 for performing various operations and an operation seat 72 are provided. The operator of the tractor 6 can perform running operation and the like of the tractor 6 through the operation unit 71.

The frame of the body of the tractor 6 is structured by an engine frame 11 and a transmission case 62 fixed to the rear portion of the engine frame 11. On the lower side of the engine frame 11, a front axle case 63 is attached. The front wheels 8 are attached to the front axle case 63 through a front axle shaft 8a. The rear wheels 9 are attached to the transmission case 62 through the rear axle shaft 9a. The areas above the right and left rear wheels 9 are covered with right and left rear fenders 65.

The transmission case 62 reduces the power from the engine main body 1 and transmits the reduced power to the front axle case 63 and the rear axle shaft 9a. The transmission gear ratio of the transmission case 62 can be changed and the running speed of the tractor 6 can be adjusted by the operator operating the shift lever of the not-shown gear-shift operation device.

Further, the drive force of the engine main body 1 is partially transmitted to a PTO shaft (not shown) protruding from the rear end of the transmission case 62. The tractor 6 is structured so that the above-described work machine is detachable to its rear end. The PTO shaft can drive the work machine through a not-shown universal joint and the like.

The tractor 6 structured as described above can perform various work such as cultivation, seeding, harvesting, and the like, while running in the field.

Next, the following details the structure of parts and devices in the engine hood 7, with reference to FIG. 2 to FIG. 5.

Figure 3:
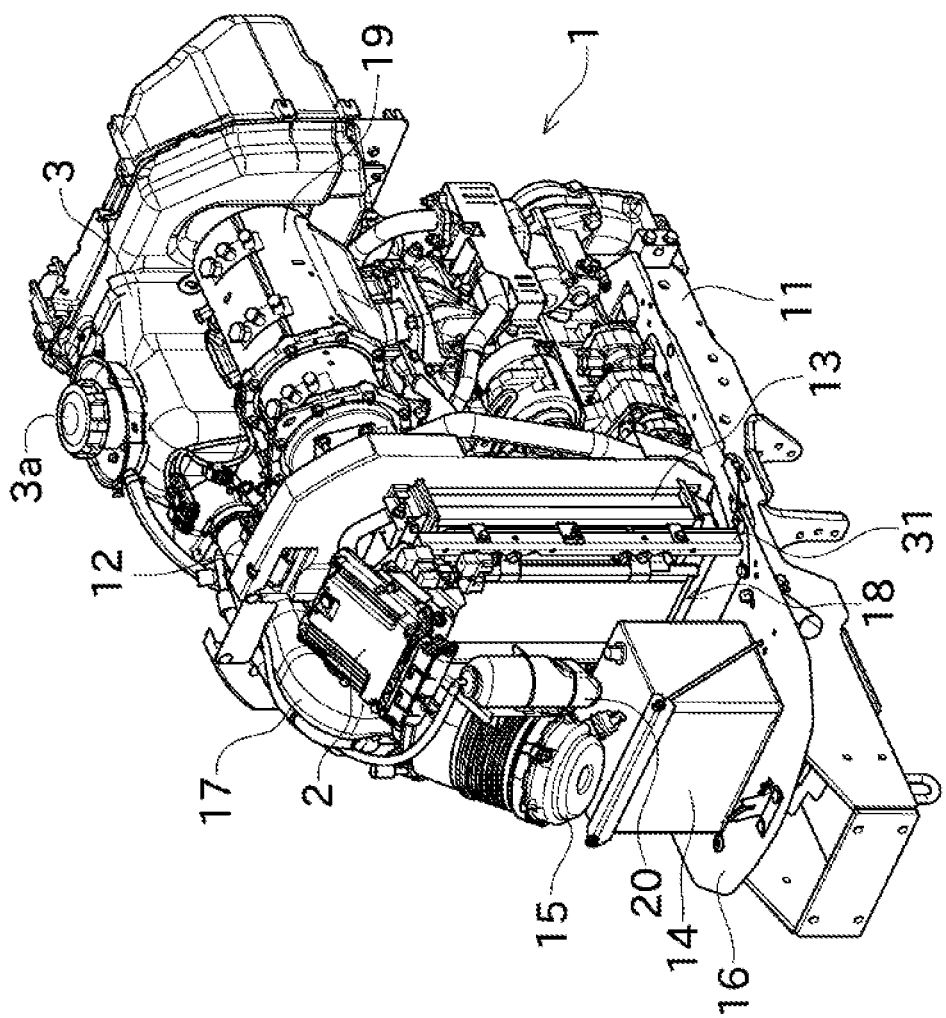
FIG. 3 A front perspective view showing a state inside the engine hood.

As shown in FIG. 2, the engine main body 1 is disposed on the upper side of the engine frame 11. As shown in FIG. 2 and FIG. 3, on the left side of the upper portion of the engine main body 1, a DPF 19 serving as an exhaust gas purification device is disposed with its length direction oriented in the longitudinal direction (front-rear direction). Further, in the upper portion of the engine main body 1, a fuel supply tank 3 is disposed so as to be adjacent to the DPF 19. In front of the engine main body 1, a cooling fan 12a for sending air to cool the engine main body 1 is provided (note however that the cooling fan 12a is not illustrated except in FIG. 11, because a fan shroud (partition plate) 12 surrounding the outer periphery of the cooling fan 12a is provided).

The fan shroud 12 is disposed in such a manner as to part the engine main body 1 disposed in the rear portion inside the engine hood 7 from parts and devices disposed in the front portion inside the engine hood 7. In front of the fan shroud 12, a radiator 13, a condenser 18, an engine controller 2, a battery 14, an air cleaner 15, a sub-tank 20, and the like are arranged. Parts and devices dispose from the center portion to the front portion inside the engine hood 7 are disposed on the upper surface side of an attachment plate 16 fixed to the engine frame 11.

Figure 9:
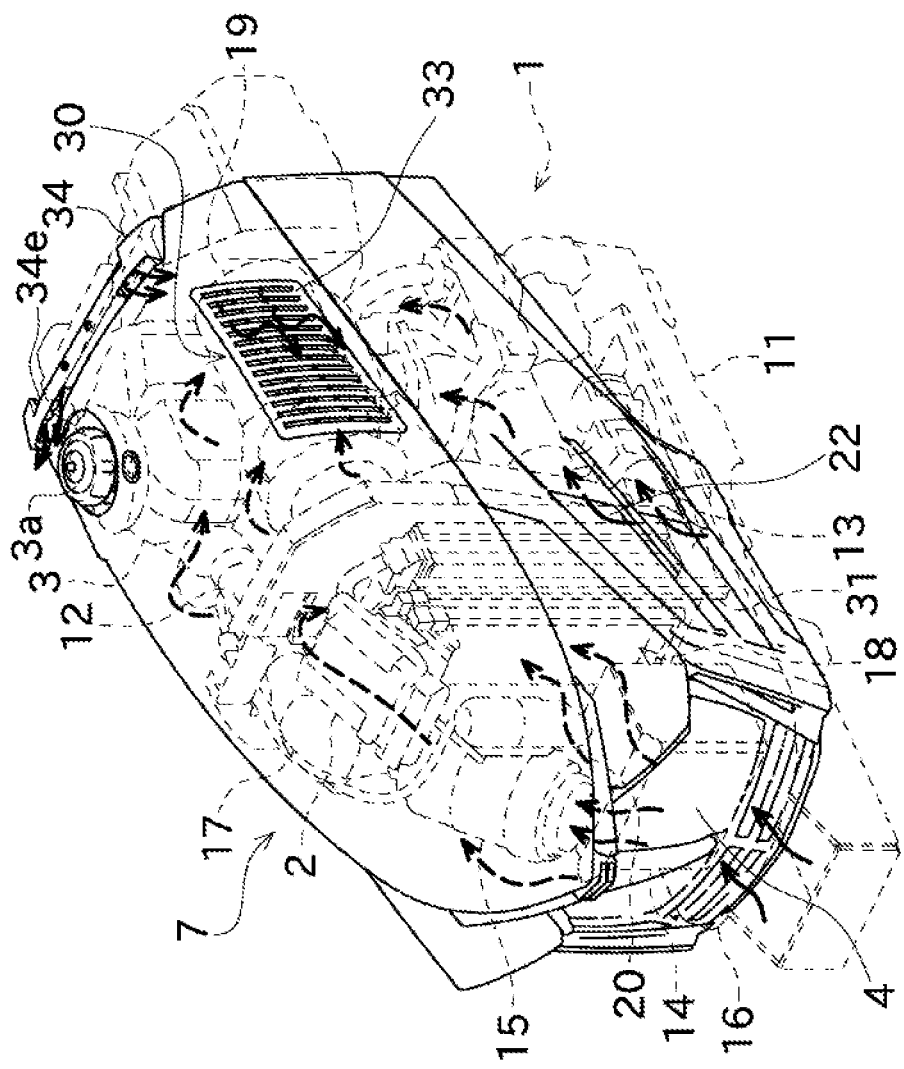
FIG. 9 A front perspective view schematically showing a flow of air inside the engine hood.

The cooling fan 12a is driven by power supplied from the engine main body 1. With rotation of the cooling fan 12a, relatively-low-temperature outside air is taken in from a front grill 4 on the front surface of the engine hood 7 and a side grill 22 on a side surface of the engine hood 7. This outside air is fed to the engine main body 1 through the radiator 13 and the cooling fan 12a. That is, as shown in FIG. 9, the air outside the engine hood 7 is taken inside the engine hood 7 through the front grill 4, the side grill 22, and the like, and passes the radiator 13 to take away the heat (air-cooling) therefrom. Then the air is fed towards the engine main body 1 by the cooling fan 12a, and air-cools the engine main body 1.

The side grill 22 is a mesh-like member, and is provided to an outside air intake port 21 (see FIG. 15 and the like) formed in a side surface of the engine hood 7. The outside air intake port 21 is formed in a side surface so as to include a position further forward than the cooling fan 12a (left side surface and right side surface in the present embodiment) of the engine hood 7. The outside air intake port 21 has an elongated shape and is slightly inclined in such a manner as to be higher as it gets closer to the rear portion from the front portion.

The fan shroud 12 surrounding the outer periphery of the cooling fan 12a is made of a synthetic resin and is structured so that an air-intake pipe 17 passes through a cut-out portion (not-shown) in the right side upper portion thereof, as shown in FIG. 3.

The DPF 19 shown in FIG. 3 is attached to an exhaust pipe configured to guide exhaust gas from the engine main body 1, and is structured to collect and remove particulate matter (PM) contained in the exhaust gas from the engine main body 1 by a filter. However, since the PM collected by the DPF 19 increases with the operation of the engine, control is performed to raise the temperature of the exhaust gas from the engine main body 1 when a certain amount or more PM is collected by the DPF 19 to burn the PM under a high temperature in the DPF 19, thereby preventing clogging of the filter (DPF renewal). Therefore, the DPF 19 can be said to be a device which is often at a high temperature, among members and devices in the engine hood 7.

Figure 6:
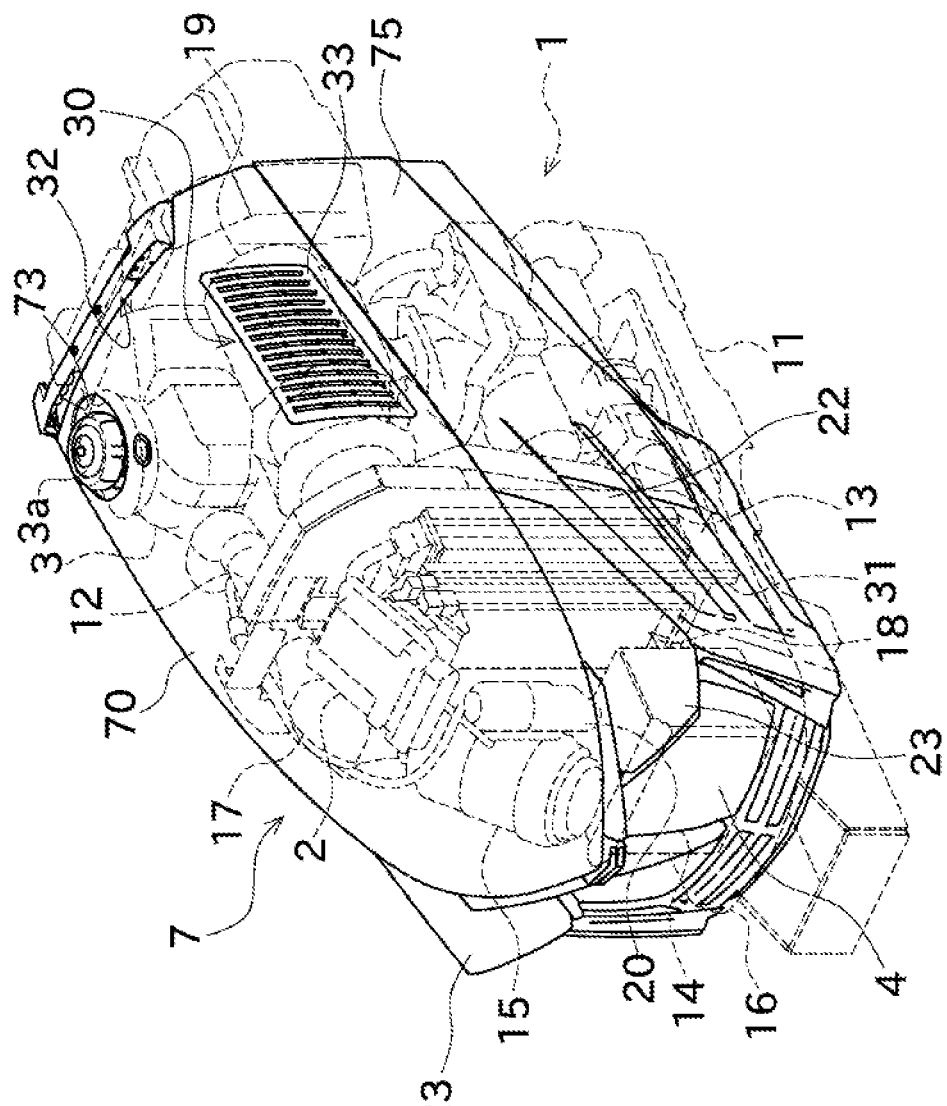
FIG. 6 A front perspective view showing a positional relationship between the engine hood and an internal structure of the engine hood.
Figure 7:
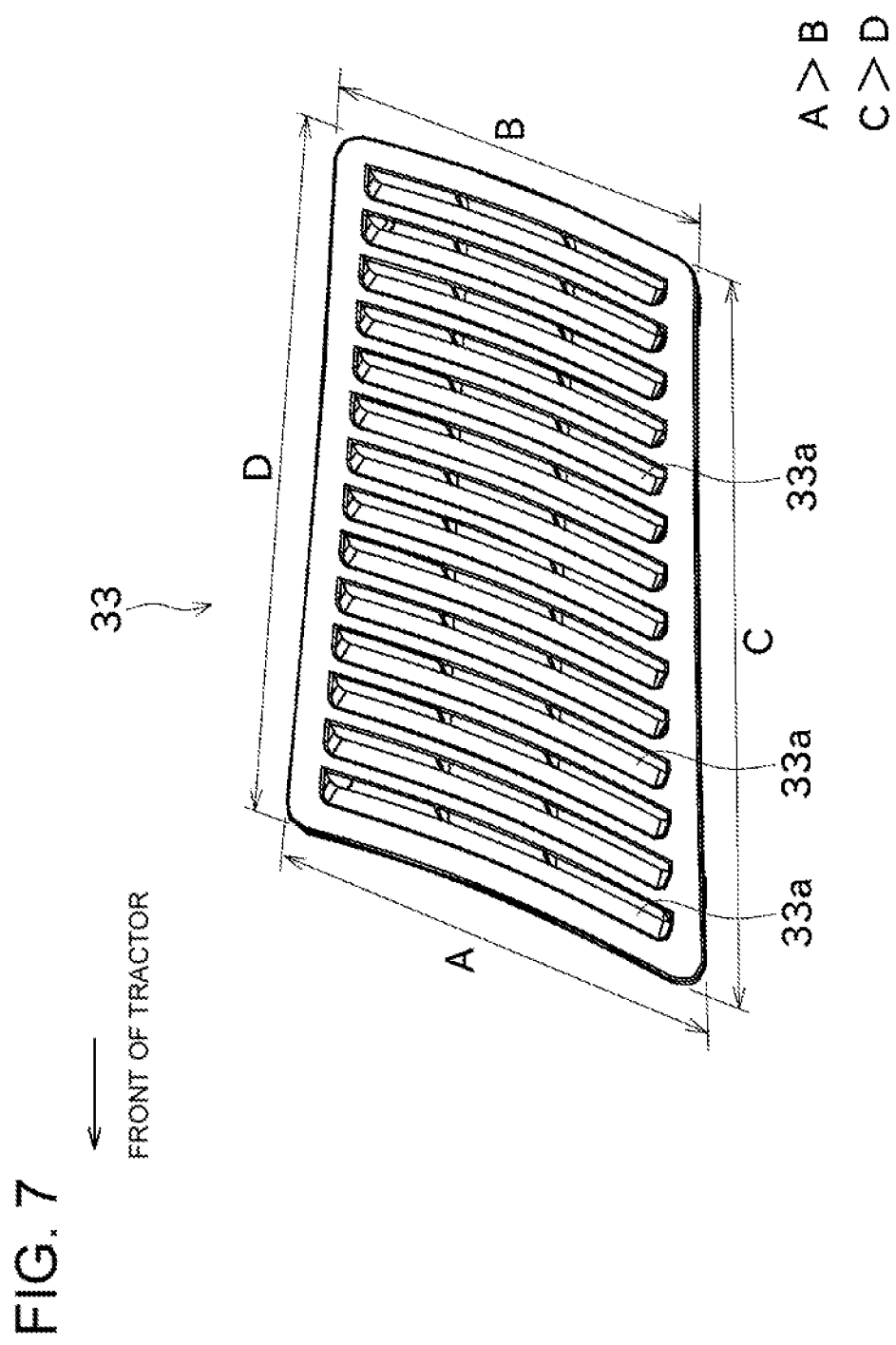
FIG. 7 A perspective view showing in detail a fin member attachable to a first opening.
Figure 8:
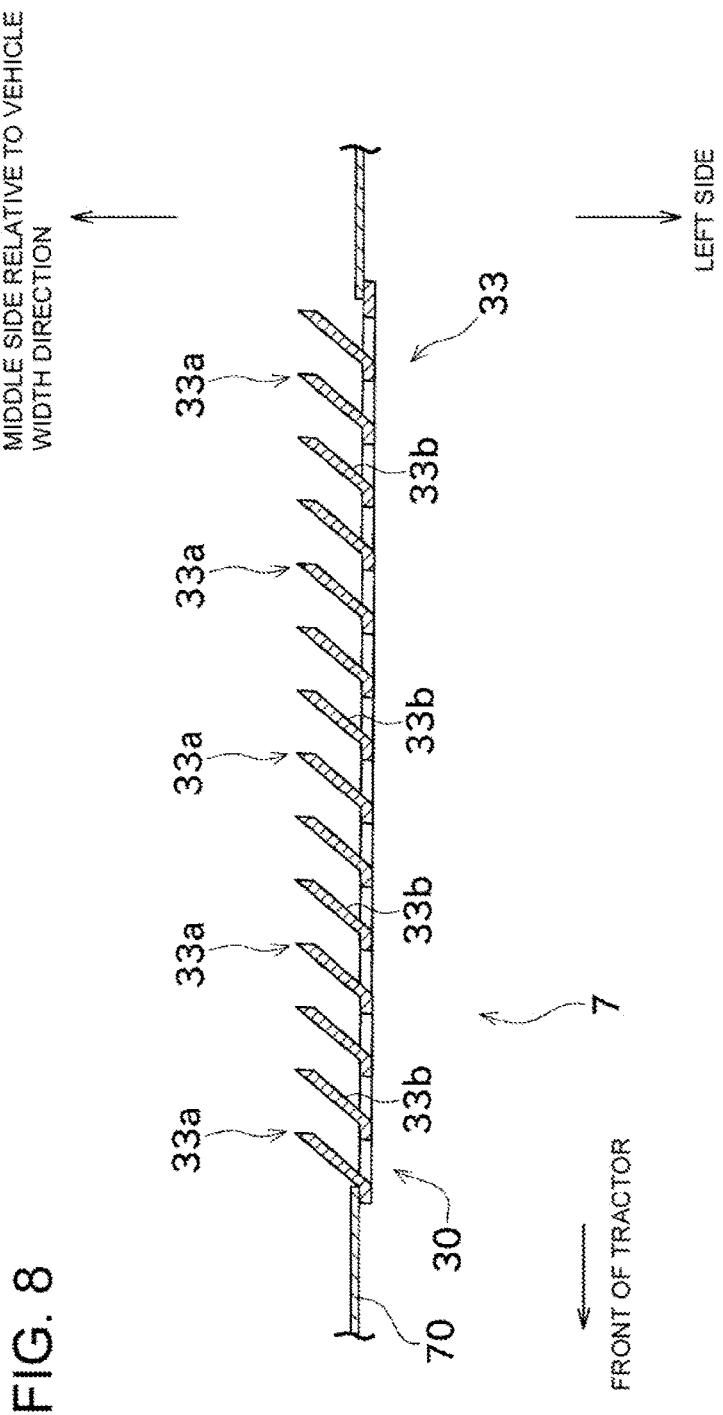
FIG. 8 A cross-sectional view showing a structure of a plurality of first fins formed on the fin member attachable to the first opening.

In the above-mentioned DPF renewal for example, the DPF 19 may generate a high temperature which could cause a thermal damage to equipment arranged therearound. In view of this, a first opening 30 is formed on a side surface of the engine hood 7 so as to be positioned nearby the DPF 19, while the engine hood 7 is closed, as shown in FIG. 6. The first opening 30 can discharge relatively high temperature air in the engine hood 7 in directions away from the operation seat 72. More specifically, in the first opening 30, a plurality of first fins 33a each having a slope surface 33b inclined forward from the inside to the outside of the engine hood 7 (from a middle side to the left side relative to the vehicle width direction) are arranged and aligned in the longitudinal direction, as shown in FIG. 8. Technically speaking, a fin member 33 having the plurality of first fins 33a as shown in FIG. 7 is disposed so the fins protrude from the first opening 30 towards inside the engine hood 7. Therefore, although the first opening 30 is partially closed by the fin member 33, the air can flow between the fins of the fin member 33.

As shown in FIG. 7, the fin member 33 is formed in a substantially trapezoidal shape in side view, and is made of a material such as resin and the like. A dimension A of the front end of the fin member 33 (i.e., the dimension relative to the length direction of first fins 33a) is set to be longer than a dimension B of the rear end of the fin member 33 (i.e., the dimension relative to the length direction of first fins 33a). Further, a dimension C of the lower end of the fin member 33 (i.e., the dimension relative to a direction in which the first fins 33a are arrayed) is set to be longer than a dimension D of the upper end of the fin member 33 (i.e., the dimension relative to a direction in which the first fins 33a are arrayed). As described, the structure in which the opening area between first fins 33a adjacent to each other increases as it approaches towards front facilitates exhaustion of high temperature air forward, and hence the work environment around the operation seat 72 can be improved.

With this structure, heat is exhausted outside the engine hood 7 by letting high temperature air inside the engine hood 7 pass through the first opening 30. Further, with the slope surface 33b of each of the first fins 33a guiding a flow of the high temperature air exhausted from the first openings 30, the high temperature air is restrained from flowing towards the operation seat 72.

Figure 4:
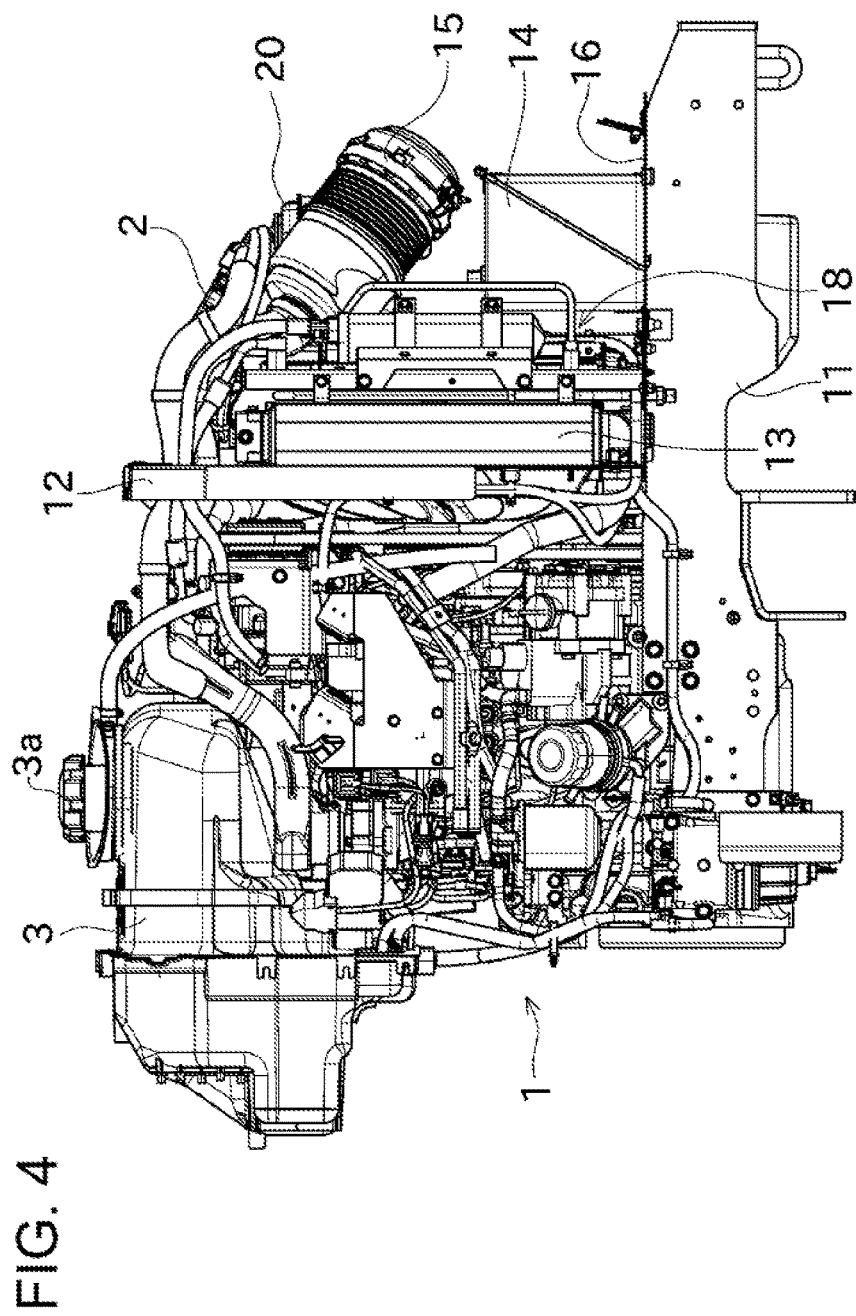
FIG. 4 A left side view showing a state inside the engine hood.
Figure 5:
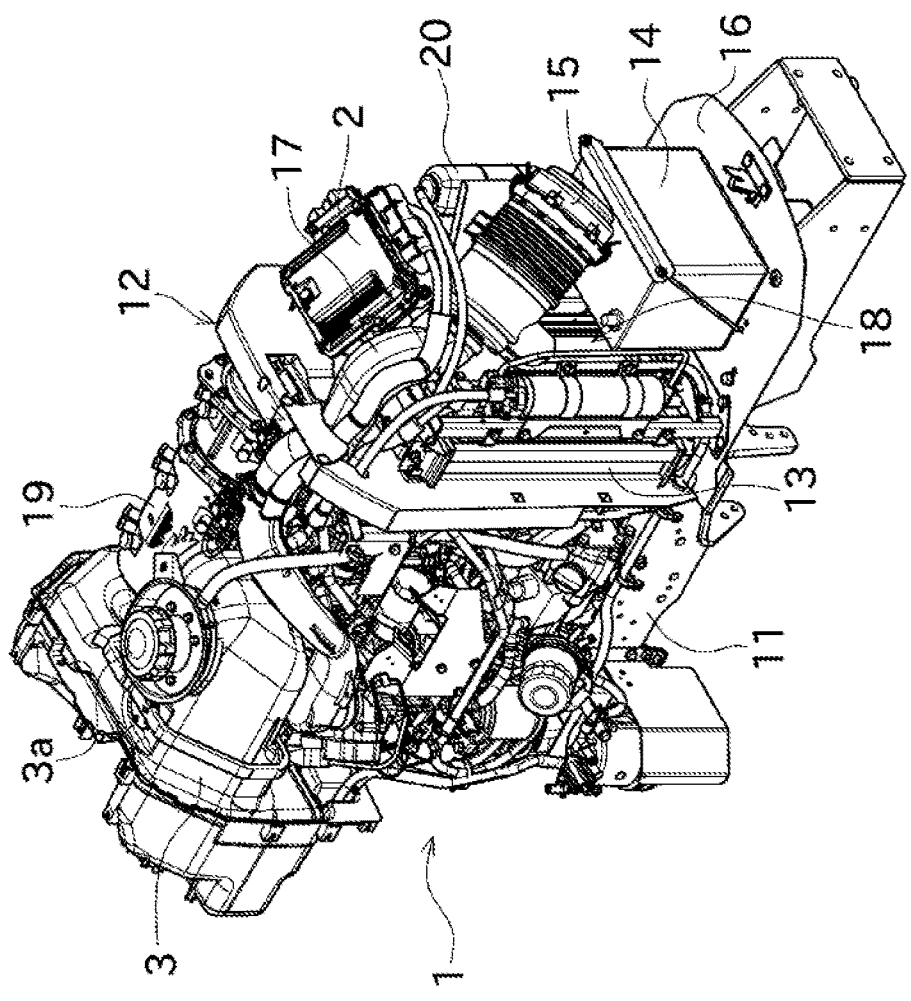
FIG. 5 A front perspective view showing a state inside the engine hood.

The radiator 13 shown in FIG. 4 and FIG. 5 is structured as a heat exchanger, and a not-shown circulation path for circulating cooling water is formed between this radiator 13 and a not-shown water jacket formed in the engine main body 1. The cooling water in the water jacket at a high temperature due to heat generation of the engine main body 1 is fed to the radiator 13. The cooling water is then cooled (air-cooled) by the outside air taken in through the front grill 4 and the side grill 22 and passing the radiator 13 as shown in FIG. 9, and is fed back to the water jacket to cool the engine main body 1.

The condenser 18 shown in FIG. 4 and FIG. 5 is structured as a heat exchanger and used as an air conditioner for conditioning the air inside the cabin 10. The condenser 18 is supported by a condenser frame 31 and attached to the front of the radiator 13.

The engine controller 2 shown in FIG. 5 is structured as a small computer. The engine controller 2 controls the engine by outputting, to various actuators (including injectors of the engine main body 1), control signals for controlling a fuel injection amount, a fuel injection timing, and the like based on information from various sensors attached to the engine main body 1 and the like. The engine controller 2 is supported via a vibration isolation support structure having a plurality of vibration isolation members, and is disposed above the condenser 18.

The battery 14 shown in FIG. 5 supplies electric power to various electric components of the tractor 6 (e.g., a cell motor of the engine main body 1, headlights of the tractor 6, the engine controller 2, and the like).

The air cleaner 15 has a structure which accommodates therein an air cleaner element for removing contaminant in the air. The air cleaner 15 is connected to an air-intake manifold of the engine main body 1 through the air-intake pipe 17.

The sub-tank 20 is structured as a container elongated in the vertical direction which is connected to the radiator 13 through a pipe, and is structured to store an overflown cooling water in the radiator 13. When the cooling water in the radiator 13 increases due to thermal expansion, the cooling water in the radiator 13 flows into the sub-tank 20. When the cooling water in the radiator 13 decreases, the cooling water in the sub-tank 20 is returned to the radiator 13. This way, the amount of cooling water in the radiator 13 is maintained at a predetermined amount.

The fuel supply tank 3 is disposed in the upper portion of the engine main body 1. As shown in FIG. 6, a fuel supply port (an opening closed by a cap) 3a is formed in the upper portion of the fuel supply tank 3, and refueling is performed therefrom. The fuel supply port 3a of the fuel supply tank 3 is arranged to protrude from a third opening 73 in the upper portion of the engine hood 7 (upper hood 70), and the operator is able to perform fuel supplying work irrespective of the open/close state of the engine hood 7. The structure of the periphery of the fuel supply port 3a of the fuel supply tank 3 is detailed later.

Figure 10:
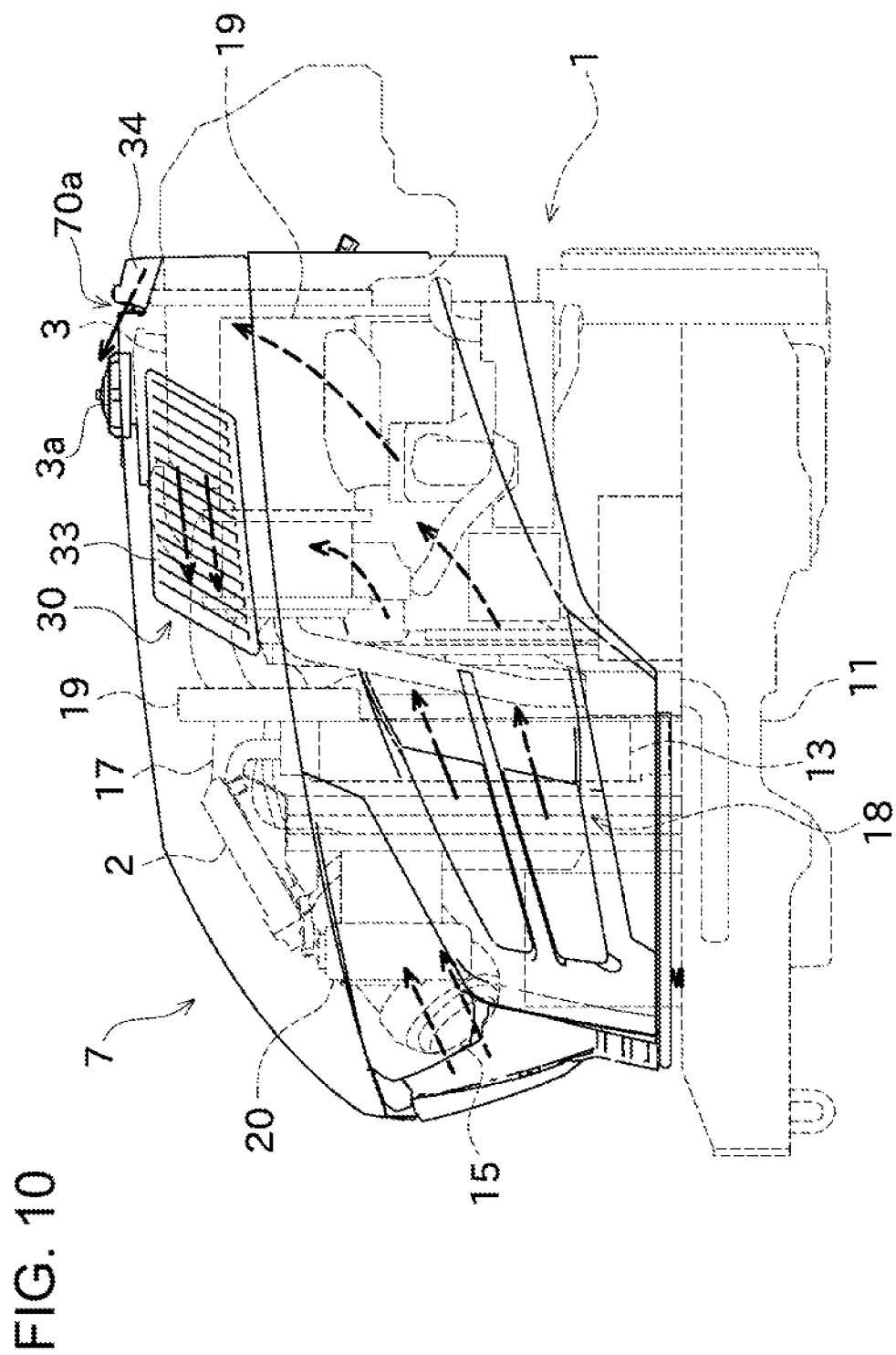
FIG. 10 A right side view schematically showing a flow of air inside the engine hood.
Figure 11:
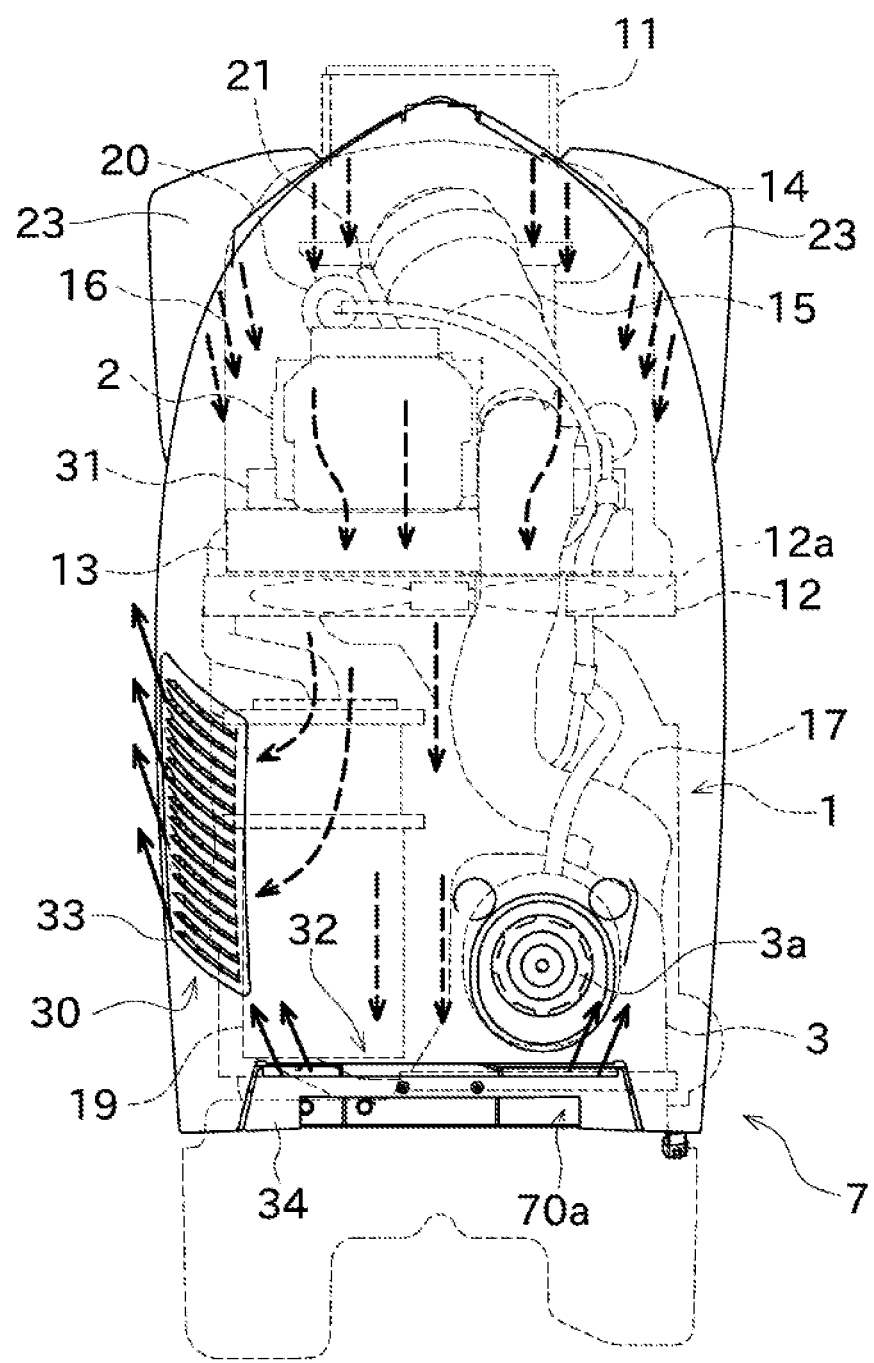
FIG. 11 A plan view schematically showing a flow of air inside the engine hood.

Next, with reference to FIG. 9 to FIG. 11, a main air flow formed inside the engine hood 7 is described.

The relatively-low-temperature air, which enters from the front grill 4 provided on the front surface of the engine hood 7 and the side grill 22 provided to a side surface of the engine hood 7 is partially taken into the air cleaner 15, and flows towards the engine main body 1 through the air-intake pipe 17. The air which is not taken into the air cleaner 15 is partially flows along the upper surface and the lower surface of the engine controller 2, and effectively cools the engine controller 2. It should be noted that the engine controller 2 is arranged in a rearwardly rising manner, and a portion of its inner wall of the engine hood 7 covering above the engine controller 2 is also arranged in a rearwardly rising manner. Therefore, the air is smoothly guided around the engine controller 2.

The part of air which entered inside the engine hood 7 through the front grill 4 and the side grill 22, and which is not taken into the air cleaner 15 mostly passes the condenser 18 and the radiator 13 arranged to cover the cooling fan 12a, with an air guide effect of the cooling fan 12a and the fan shroud 12a. At this time, since the air is introduced not only from the front grill 4 but also from the side grill 22, the relatively-low-temperature air is supplied not only to the middle portion of the condenser 18 and the radiator 13, but also to the vicinity of the left and right end portions, thus cooling the condenser 18 and the radiator 13 by heat exchanging.

The air, after passing the radiator 13, is fed rearward by rotation of the cooling fan 12a. Then, the air hits the front surface of the engine main body 1 and spreads radially, and flows rearward in the upper left and right space of the engine main body 1. This way, the engine main body 1 is efficiently cooled. Further, the air flowing along the left side surface of the engine main body 1 smoothly flows along the length direction of the DPF 19, and as the result, efficiently cools the DPF 19 whose temperature tends to become a high temperature. The air having flown to the rear of the fan shroud 12 takes heat away from the engine main body 1 and the DPF 19 and becomes relatively-high-temperature air, and the most of it is exhausted outside the engine hood 7 from the first opening 30 on the side surface of the engine hood 7, which is positioned to substantially face the DPF 19 in the lateral direction. This way, the heat of the DPF 19 and the like is efficiently released to the outside of the engine hood 7.

The direction of the air exhausted from the first opening 30 is guided by the first fins 33a of the fin member 33 so as to flow along the slope surfaces 33b of the first fins 33a. Accordingly, relatively-high-temperature air is discharged from the first opening 30 towards front left of the tractor 6 as indicated by arrows in FIG. 9. This way, the air with a high temperature is restrained from flowing towards the operation seat 72.

Further, as shown in FIG. 6, in the tractor 6 of the present embodiment, a second opening 32 is formed, in addition to the first opening 30, as an exhaust port for exhausting the air inside the engine hood to the outside, so as to improve the cooling effect inside the engine hood 7. The following details this second opening 32 with reference to FIG. 12 and FIG. 13.

Figure 12:
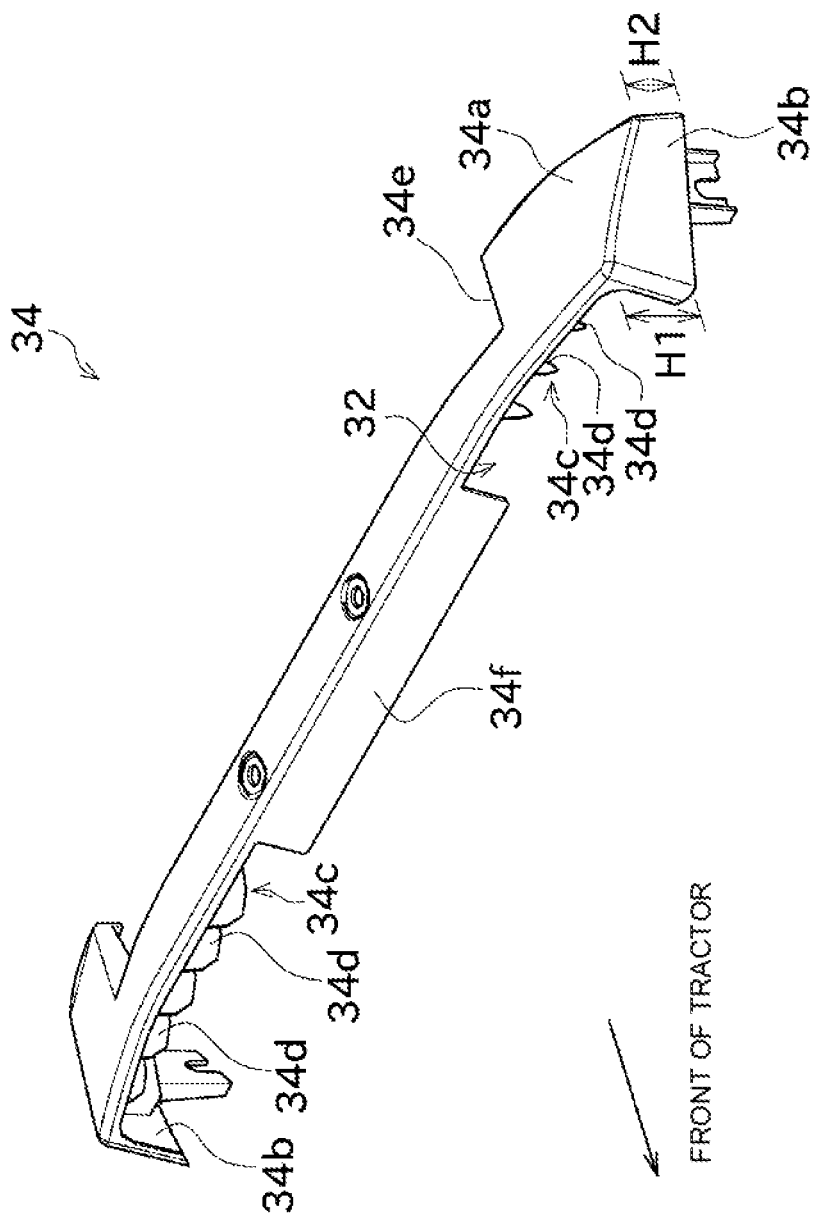
FIG. 12 A perspective view showing a structure of a guide member arranged at the rear of the engine hood.
Figure 13:
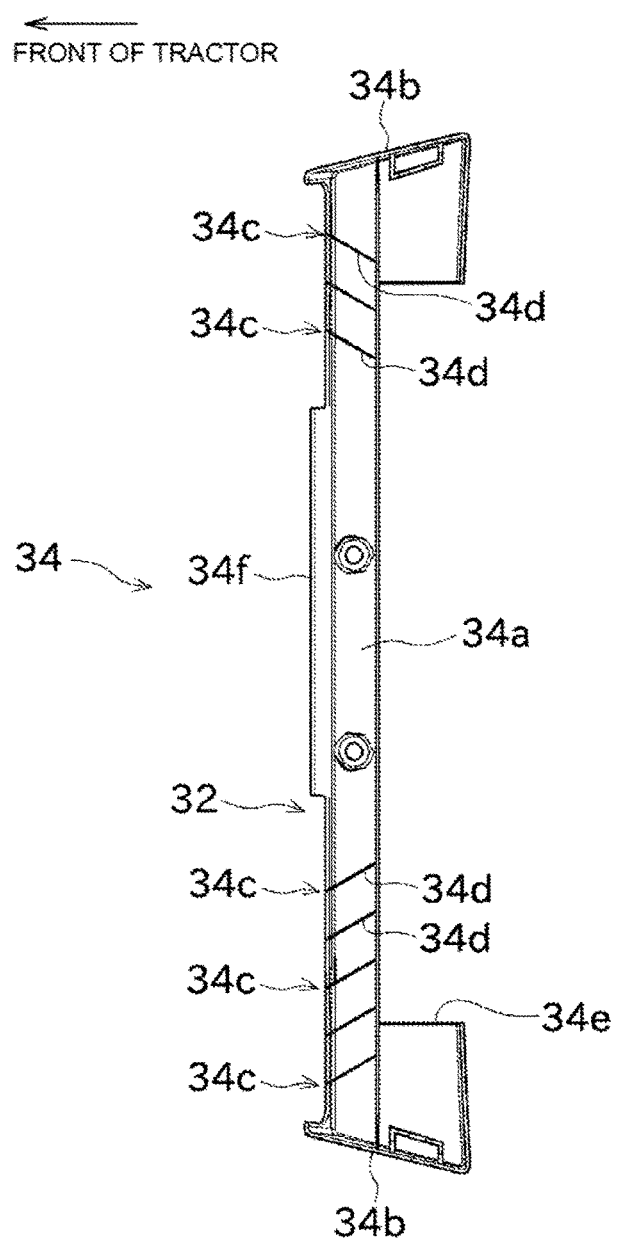
FIG. 13 A bottom view showing a structure of a guide member for a tractor having a cabin.
Figure 15:
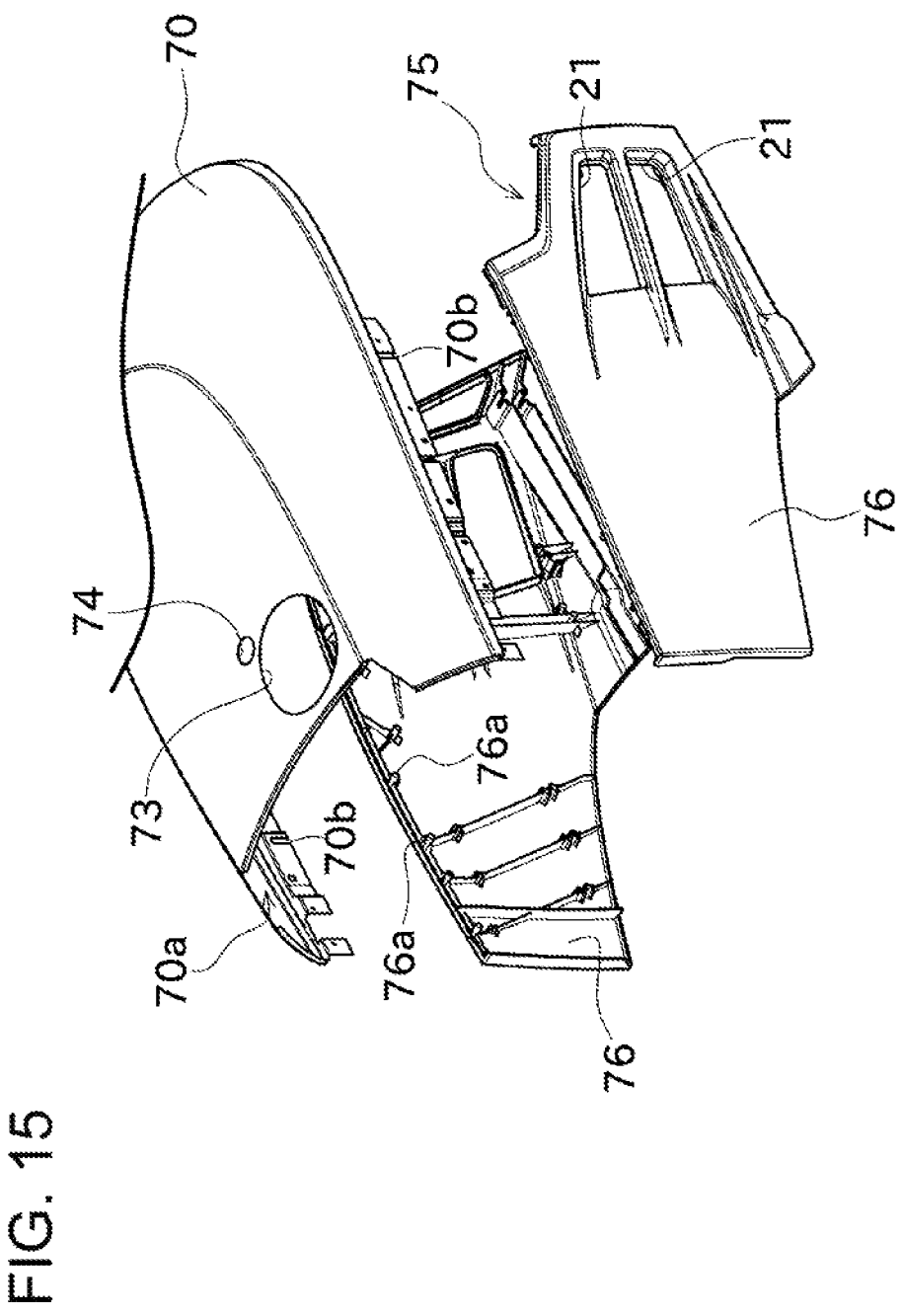
FIG. 15 An exploded rear perspective view showing a structure of an upper hood and a lower hood of the engine hood.

Immediately behind the rear end of the upper portion of the engine hood 7, a guide member 34 as shown in FIG. 12 and FIG. 13 is arranged, and the second opening 32 is formed by this guide member 34. More specifically, as shown in FIG. 15, a cut-out portion 70a is formed at the rear end in the upper portion of the engine hood 7 (specifically, the later-described upper hood 70), and the guide member 34 is accommodated in this cut-out portion 70a. The guide member 34 is arranged in front of the operation seat 72.

The guide member 34 is supported by a frame supporting the engine hood 7 (specifically, by an upper end surface of a later-described rear frame 41). The guide member 34a includes: a horizontal portion 34a elongated in the vehicle width direction, and a pair of left and right vertical portions 34b extended downward from both ends of the horizontal portion 34a.

Figure 18:
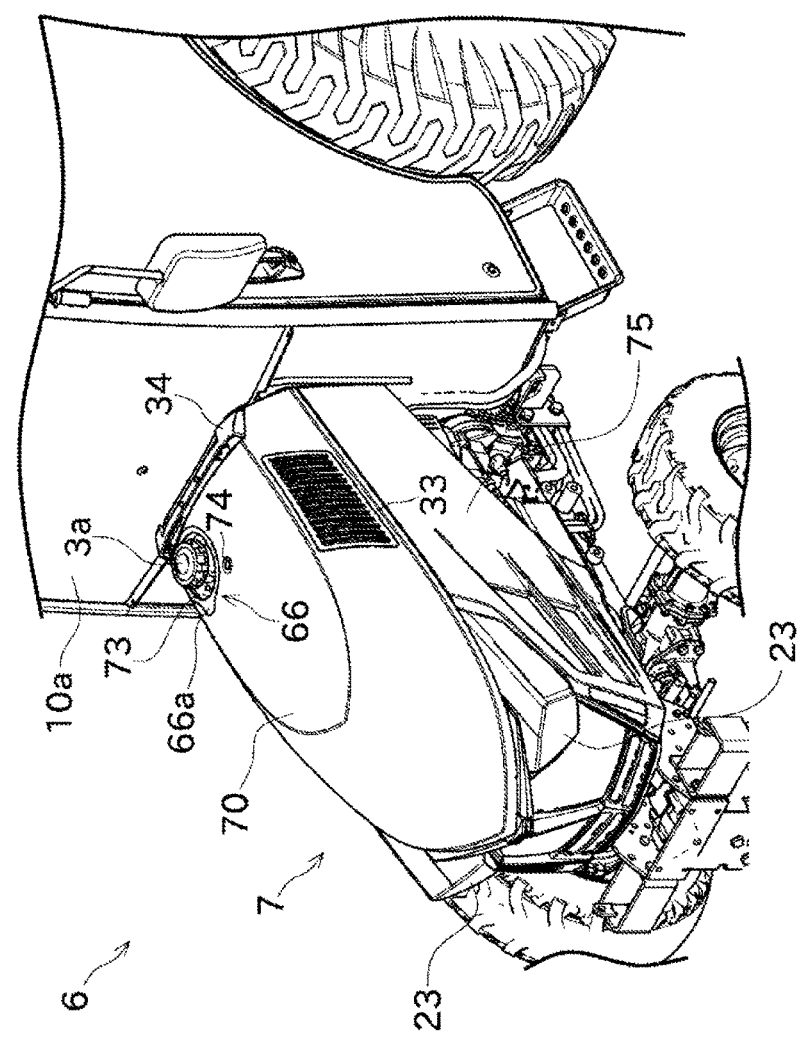
FIG. 18 A front perspective view showing a structure in which the engine hood and its peripheral structure are applied to a tractor having a cabin.

The horizontal portion 34a of the guide member 34 is arranged so that its level is slightly higher than the upper surface of the engine hood 7, in the vicinity of upper surfaces of the left and right end portions of the engine hood 7. A space surrounded by the horizontal portion 34a and the pair of left and right vertical portions 34b structure the second opening 32 opened forward. As shown in FIG. 18, the rear end portion of the guide member 34 is arranged so as to be close to the front surface 10 of the cabin 10a.

More specifically, as shown in FIG. 12, a dimension H1 of the front end portion of each vertical portion 34b relative to the vertical direction is structured as to be longer than a dimension H2 of the rear end portion of the vertical direction 34b relative to the vertical direction (H1>H2), so that the second opening 32 faces upper front.

The second opening 32 is positioned immediately above the engine hood 7, as shown in FIG. 6. With this structure, the second opening 32 is able to exhaust the air inside the engine hood 7 in a direction away from the operation seat 72 (forward and slightly upward). It should be noted that the middle portion of the second opening 32 relative to the vehicle width direction is mostly closed by a closing part 34f which extends vertically downward from the front end of the horizontal portion 34a.

On the left and right sides of the space surrounded by the horizontal portion 34a and the vertical portions 34b, a plurality of second fins 34c are aligned. More specifically, the second fins 34c are connected so as to protrude downward from the under surface of the horizontal portion 34a. Further, the second fins 34c each has a slope surface 34d which is inclined in such a manner as to be further forward as it gets closer to the outside from a middle relative to the vehicle width direction.

With this structure, an amount of the air which became high temperature air by taking away the heat from the engine main body1 and the DPF 19, and which is not exhausted outside the engine hood 7 from the first opening 30 passes the second opening 32 and is exhausted forward and slightly upward from the tractor 6. At this time, the direction of the air passing the second opening 32 is branched into left and right by the closing part 34f, and further guided to the left and right outer sides by the slope surface 34d of each of the second fins 34c. This way, the heat of the DPF 19 and the like can be more efficiently released to the outside of the engine hood 7. Further, as shown in FIG. 9 to FIG. 11, since the high temperature air exhausted from the second opening 32 is guided in directions away from the operation seat 72, a favorable work environment of the operator can be maintained. It should be noted that, as hereinabove mentioned, the heated air is blown out from areas (left and right sides) of the second opening 32, excluding the middle portion thereof. Therefore, for example, even when the high temperature air from the second opening 32 flows relatively rearward when the tractor 6 advances, it is possible to restrain the air from flowing to the operation seat 72 in the middle portion relative to the vehicle width direction. This effect is particularly advantageous in a later-described tractor without a cabin.

Next, the engine hood 7, parts that are accompanied to the engine hood 7, and a supporting structure of the engine hood 7 are described more in detail with reference to FIG. 14 to FIG. 19.

As shown in FIG. 15, the engine hood 7 is structured by connecting the upper hood (upper member) 70 constituting the upper portion and a lower hood (lower member) 75 constituting the lower portion, with each other. The upper hood 70 is formed into an upwardly bulged shape through deep drawing of a sheet metal.

Figure 14:
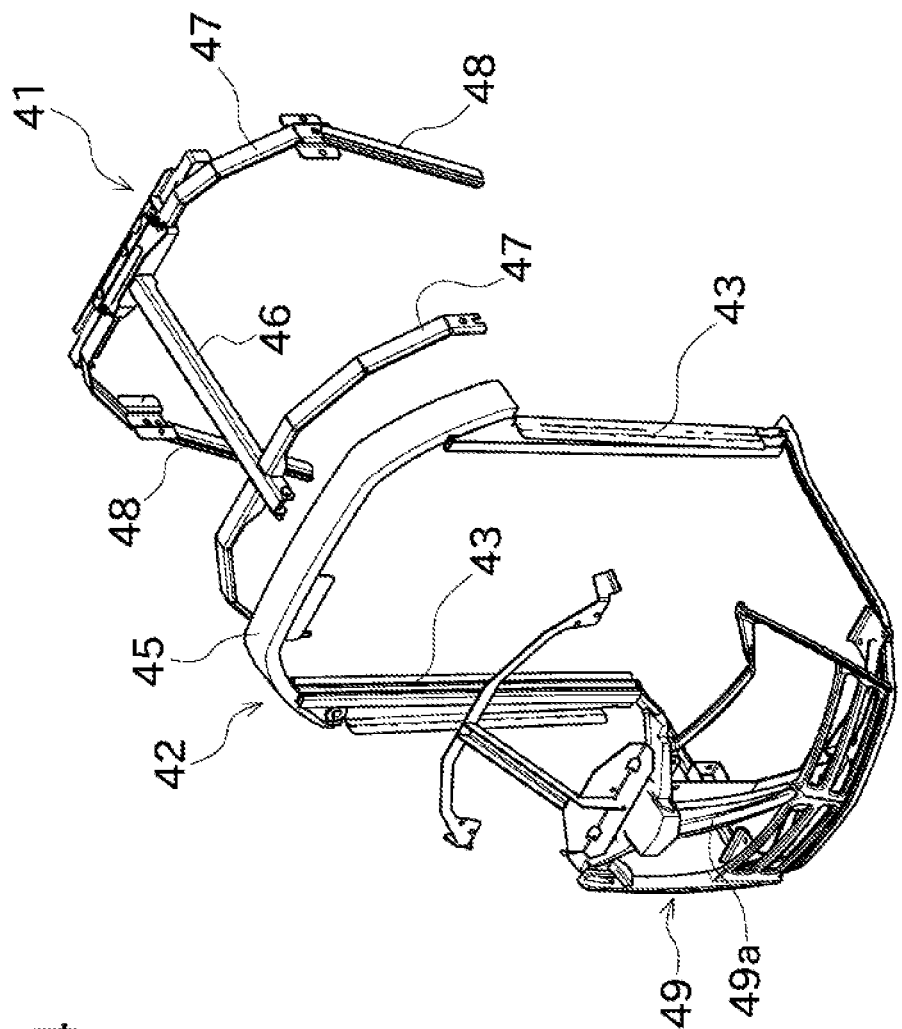
FIG. 14 A front perspective view showing a structure of a support structure in a front portion of the tractor.

The upper hood 70 is supported by the front frame 42 and the rear frame 41 shown in FIG. 14.

The front frame 42 is structured by a pair of left and right support columns 43 elongated in the vertical direction, and a curved member 45 provided in a bridging manner over the pair of left and right support columns 43. On this curved member 45, the front portion of the upper hood 70 is fixed.

The rear frame 41 is structured by connecting substantially U-shaped stays 47 by welding and the like to the front end portion and the rear end portion of a middle frame 46 extended in the longitudinal direction. Each of the stays 47 is formed by bending a metal made plate member to have an L-shape cross section, and is suitably curved to form convex upward along the shape of the upper hood 70. In a traditional structure, a frame that corresponds to this rear frame 41 is integrally formed by using a large-sized die. In this regard, in the present embodiment, there is no need of using a die, because the rear frame 41 is structured by using the stays 47 connected by welding and the like. Therefore, reduction of manufacturing costs can be achieved.

To the left and right end portions (lower end portions) of the stay 47 connected to the rear portion side of the rear frame 41, upper ends of reinforcement frames 48 are fixed. The reinforcement frames 48 are each elongated in the vertical direction, and improves the strength of side surface portions 76 of the lower hood 75.

The lower hood 75 shown in FIG. 15 is a member made of resin which is formed by injection molding, and has the pair of left and right side surface portions 76. The left and right side surface portions 76 are formed left-right symmetrically. The left side surface portion 76 is arranged so that its inside surface is along the left support column 43 and the reinforcement frame 48. Further, the right side surface portion 76 is arranged so that its inside surface is along the right support column 43 and the reinforcement frame 48.

Figure 16:
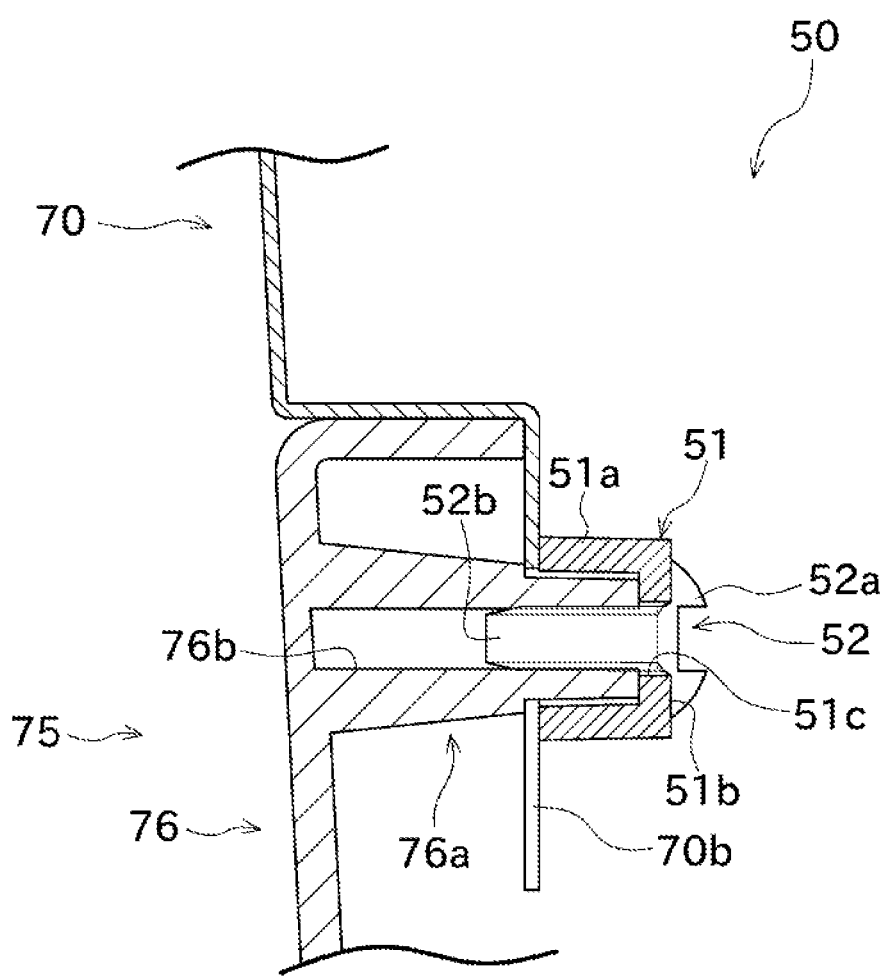
FIG. 16 A cross-sectional view showing a connection structure between the upper hood and the lower hood.

The lower end of the upper hood 70 and the upper end of the lower hood 75 are connected to each other by a connection structure 50 shown in FIG. 15 and FIG. 16, in such a manner as to leave no gap in side view as shown in FIG. 10. The connection structure 50 is structured by shaft portions 76a formed on the side surface portions 76 of the lower hood 75, groove portions 70b formed on the upper hood 70b, a collar member 51, and tapping screws 52, as shown in FIG. 16.

As shown in FIG. 15, the plurality of shaft portions 76a are aligned in the longitudinal direction in the upper end portions of the left and right side surface portions 76 of the lower hood 75. Each of the shaft portions 76a protrude substantially horizontally from the inside surface of the side surface portion 76 towards the middle of the engine hood 7 relative to the lateral direction. As shown in FIG. 16, the shaft portions 76a is each formed in a stepped shape such that the outer diameter at the distal end portion is smaller than the outer diameter at the proximal end portion. Further, the shaft portion 76a has a hole 76b for screw-fastening, and this hole 76a is opened at the distal end surface of the shaft portion 76a.

The groove portions 70b are each formed in a shape elongated in the vertical direction, and is opened at the lower end of the upper hood 70. As shown in FIG. 15, the plurality of groove portions 70b are aligned in the longitudinal direction in positions corresponding to the shaft portions 76a formed on the side surface portions 76 of the lower hood 75. The width of each of the groove portions 70b is slightly wider than the outer diameter of the distal end portion of the shaft portion 76a, but is narrower than the outer diameter of the proximal end portion. Thus, the distal end portion of the shaft portion 76a can be inserted into the groove portion 70b.

The collar member 51 shown in FIG. 16 has a cylindrical portion 51a formed in a hollow cylindrical shape, and a flange portion 51b closing one end of the cylindrical portion 51a. Thus, the cylindrical portion 51a is structured so that the distal end portion of the shaft portion 76a can be inserted therein. Further, the flange portion 51b has a circular through hole 51c at its center. Into this through hole 51c, a shaft portion 52b of the tapping screw 52 to be screw-fastened to the hole 76b of the shaft portion 76a can be inserted.

The tapping screw 52 has a head portion 52a and the shaft portion 52b protruding from the head 52a. A male screw is formed on the shaft portion 52b.

With this structure, the distal end portion of each of the shaft portions 76a of the lower hood 75 is first inserted into the corresponding one of the groove portion 70b (on the upper hood 70b), and the lower hood 75 and the upper hood 70 are positioned so as to be connected without a gap there between, when viewed from a side. Then, the collar member 51 is placed over the distal end portion of the shaft portion 76a which passes the groove portion 70b of the upper hood 70 and protrudes inwardly relative to the lateral direction. In this state, the shaft portion 52b of the tapping screw 52 is inserted into the through hole 51c formed in the flange portion 51b of the collar member 51, and is screwed therein, while tapping the hole 76b of the shaft portion 76a. This way, the upper hood 70 is sandwiched and fixed between the collar member 51 and the proximal end portion of the shaft portion 52b. Thus, the upper hood 70 and the lower hood 75 are connected with each other.

In a traditional structure, to fix an upper hood with a lower hood, for example, the lower end of the upper hood is perpendicularly bent inward, and the upper end of the lower hood is perpendicularly bent inward. Between these bent portions, a member for obtaining an effective length for screwing is interposed, and the upper hood and the lower hood are fixed to each other by screw fastening. In this case, the presence of an extra member between the upper hood and the lower hood significantly impaired the design. In this regard, with the connection structure 50 of the present embodiment, it is possible to fix the upper hood 70 to the lower hood 75 without a gap therebetween when viewed from a side. An exterior appearance of the engine hood 7 that gives an impression of sophistication can be achieved. Further, by extending the length of the shaft portion 76a protruded towards inside of the engine hood 7 by an amount of the collar member 51, an effective length for screwing is favorably obtained. Further, since the collar member 51 and the shaft portion 76a are disposed inside the engine hood 7, the design can be improved without affecting the exterior appearance of the engine hood 7.

As described above, in the rear portion of the engine hood 7, the upper hood 70 and the lower hood 75 are vertically connected without a gap in side view. On the other hand, the front portion of the lower hood 75 is formed so that the upper ends of the side surface portions 76 gradually approach the lower end side as it goes forward. Therefore, on the left and right sides in the front portion of the engine hood 7, there are gaps between the upper hood 70 and the lower hood 75. In these gaps, a pair of left and right headlights 23 shown in FIG. 18 are fitted from inside the engine hood 7, and are fixed by using a fastening member and the like. In this structure, the headlights 23 functions not only simply as a light, but also as a structure which is integrated with the engine hood 7 to improve the rigidity of the engine hood 7.

In a structure of a traditional tractor, the headlights are generally attached to the side surfaces of the engine hood. This necessitated a frame structure (e.g., a stay and the like projecting to the outside) for supporting the headlights, on the side surfaces and the like of the engine hood. In this regard, since the headlights 23 are combined with the engine hood 7 to be an integrated structure in the present embodiment, there is no need of the above-described frame structure, and the structure can be simplified.

It should be noted that the lower hood 75 is not in the front end portion of the engine hood 7, and there is a gap below the upper hood 70 (below the headlights 23). In this gap, a front grill frame 49 shown in FIG. 14 is disposed. The front grill frame 49 is for supporting the front grill 4 for taking in the outside air into the engine hood 7.

As shown in FIG. 14, the front grill frame 49 is structured to have a substantially pentagonal shape when viewed from the front. In the middle portion of the front grill frame 49 relative to the lateral direction, a middle frame 49a extended in the vertical direction is provided. This middle frame 49a divides the front grill frame 49 into two on the left and right, and therefore two (a pair of) left-right symmetrical front grills 4 can be attached. The left half portion of the front grill frame 49 is formed so as to follow the shape of the front grill 4 arranged on the left side. The right half portion of the front grill frame 49 is formed so as to follow the shape of the front grill 4 arranged on the right side.

Figure 17:
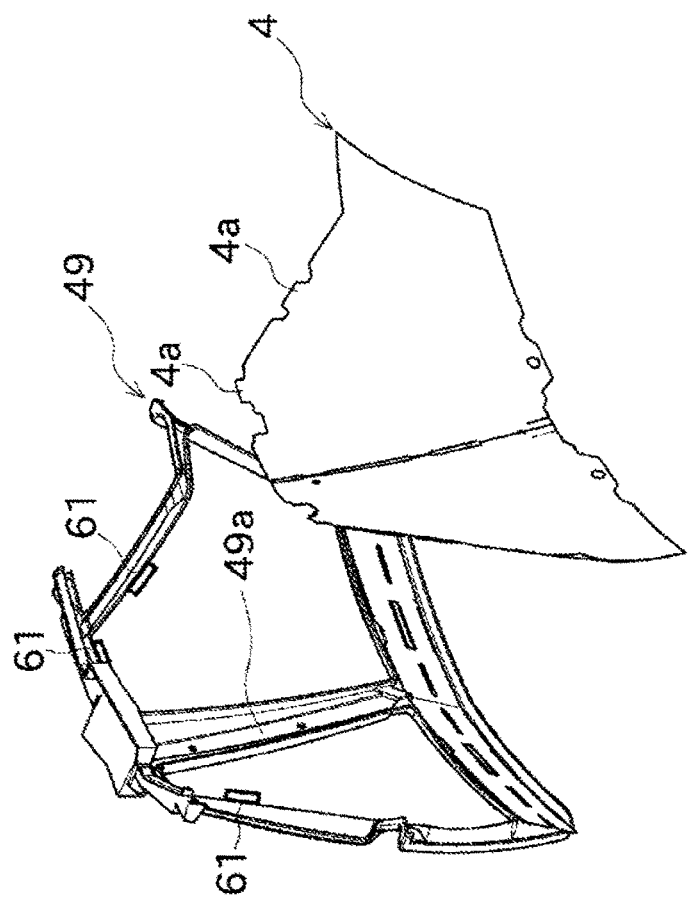
FIG. 17 An exploded rear perspective view showing a structure of a front grill frame and a front grill attachable thereto.

FIG. 17 shows the front grill frame 49 and the front grill 4 viewed from the rear. As shown in FIG. 17, in the upper portion of the inner side of the front grill frame 49, a plurality of rectangular frame-like mounting parts 61 used for attaching the front grill 4 are formed with a space therebetween. To the front grill 4, a plurality of insertion flaps 4a corresponding to the mounting parts 61 are provided with a space therebetween. With this structure, the front grill 4 is attached to the front grill frame 49 from inside the engine hood 7, by inserting from the lower side the insertion flaps 4a into the attaching portions 61. It should be noted that an attaching hole is formed in the lower portion of the front grill 4, and the front grill 4 is reliably prevented from falling off by screwing the front grill 4 to the front grill frame 49.

In a traditional tractor, a front grill is generally attached to a front grill frame 49 by using fasteners such as screws, bolts, and the like to all the positions of the front grill frame 49, where the front grill is to be fixed. Therefore, it took time and labor to assemble the front grill. In this regard, in the present embodiment, the front grill 4 can be attached to the front grill frame 49 only by inserting the insertion flaps 4a into the attaching portions (insertion opening) 61, in relation to part of portions to be fixed. Thus, the frequency of using tools and the like during assembly can be reduced, and the time and labor needed for assembling the front grill 4 can be reduced.

Thus, a structure shown in FIG. 18 can be obtained by assembling the main structures (the engine hood 7, the headlights 23, front grill 4 and the like) constituting the front portion of the tractor 6 with one another.

As shown in FIG. 15, in the upper surface of the upper hood 70, a circular-shaped third opening 73 for letting the fuel supply port 3a of the fuel supply tank 3 protrude therethrough is formed. In the vicinity of the third opening 73, a circular-shaped fourth opening 74 which is smaller than the third opening 73 is formed. In this fourth opening 74, a window washer nozzle for spraying cleaning liquid to the glass at the front of the cabin 10 is disposed.

To the third opening 73, a protection cover 66 for covering the edge portion is fixed. The protection cover 66 is made of an elastically deformable material such as rubber. The shape of the protection cover 66 is a substantially circular frame shape, and only a portion of its outer circumference is extended in a direction away from the center of the frame (circle) (that portion may be hereinafter referred to as extension portion 66a).

In the tractor 6 of the present embodiment, the protection cover 66 is assembled with the third opening 73, with its extension portion 66a oriented in such a manner as not to overlap the fourth opening 74 (in a direction such that the extension portion 66a is off the fourth opening 74).

In a structure of a traditional tractor, to prevent the edge portion (cut end) of the opening through which a fuel supply port of a fuel supply tank protrude from being exposed to the outside, the outer circumference of the opening is stamped to bend downward, which makes the shape of the die became complicated and caused an increase in the manufacturing costs. In this regard, in the tractor 6 of the present embodiment, the edge portion of the third opening 73 is covered with the protection cover 66. Therefore, a simple structure can be achieved and the manufacturing cost can be reduced.

Figure 19:
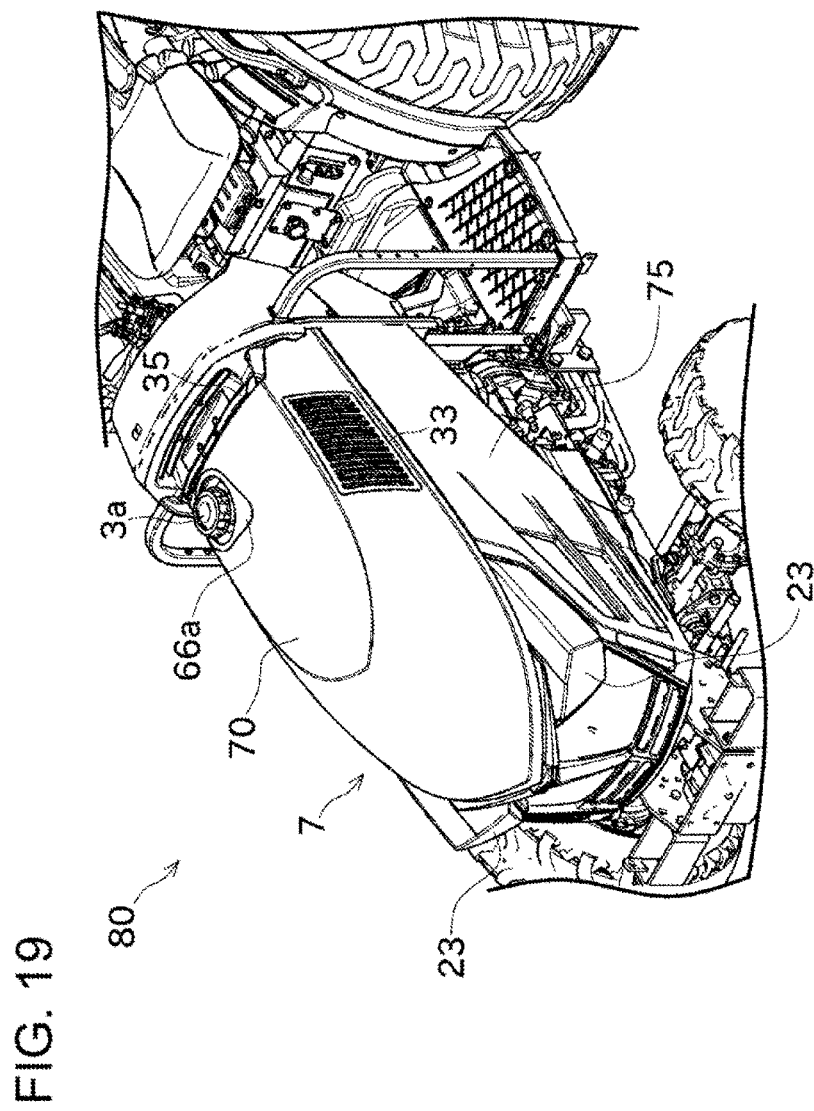
FIG. 19 A front perspective view showing a structure in which the engine hood and its peripheral structure are applied to a tractor having no cabin.

It should be noted that the engine hood 7 described in the present embodiment can be applied not only to the tractor 6 having the structure shown in FIG. 18, but also to a tractor 80 without a cabin as shown in FIG. 19. In cases of having no cabin, the fourth opening 74 is not necessary, because there is no need of arranging a window washer nozzle. In this case, the protection cover 66 is assembled with the third opening 73, with its extension portion 66a directed to cover the fourth opening 74 (to overlap the extension portion 66a over the fourth opening 74). This way, the same parts can be used for the tractor 6 and the tractor 80 whose specifications are different from each other, and the manufacturing costs can be reduced.

As hereinabove described, the cut-out portion 70a as shown in FIG. 15 is formed at the rear end in the upper portion of the upper hood 70, and the guide member 34 for forming the second opening 32 is arranged in this cut-out portion 70a as shown in FIG. 18. As shown in FIG. 12, the guide member 34 to be assembled with the tractor 6 of the present embodiment has, at its rear end portion of the horizontal portion 34a, a cut-out portion 34e having a shape elongated in the lateral direction. Below this cut-out portion 34e, a mechanism for activating a wiper (not shown) for cleaning the glass at the front of the cabin 10 is arranged.

A member having substantially the same structure as the guide member 34 can be applied to the tractor 80 with no cabin (the member is hereinafter referred to as guide member 35); however, since the wiper is omitted in such a case, the cut-out portion 34e is not necessary. In view of this, although the same dies are used for both a case of manufacturing the guide member 34 for the tractor 6 with the cabin 10 and a case of manufacturing the guide member 35 for the tractor 80 with no cabin, two types of members, i.e., the guide member 34 having the cut-out portion 34e and the guide member 35 having no cut-out portion 34e can be manufactured by replacing an insert of a die (or switching between processing with or without an insert). Simply by changing the insert for forming as described above, application of the above structure can be extended to various types of tractors, and the overall manufacturing costs can be reduced.

Figure 20:
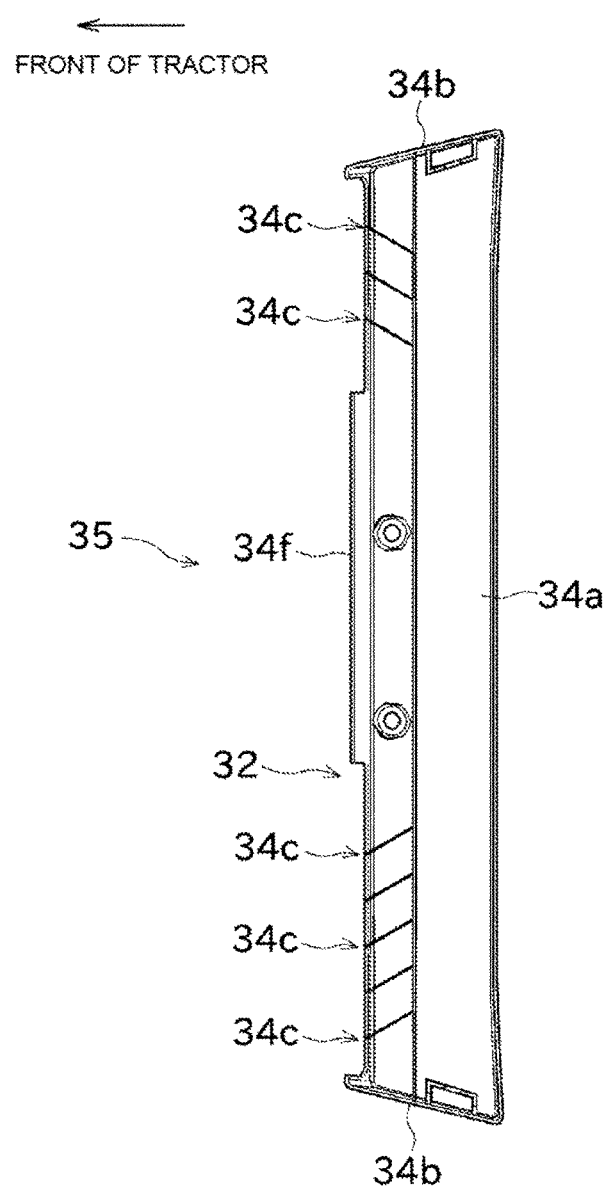
FIG. 20 A bottom view showing a structure of a guide member for a tractor having no cabin

It should be noted that FIG. 20 provides a bottom view of the guide member 35 for the tractor 80 having no cabin.

Similarly, in regard to the lower hood 75 and the front grill frame 49 for example, lower hoods 75 and the front grill frames 49 of different sizes can be easily manufactured by using the same dies and by changing only the insert, and hence the overall manufacturing costs can be reduced.

As hereinabove described, a tractor 6 of the present embodiment includes: an engine main body 1, a cooling fan 12a, a DPF 19 serving as an exhaust gas purification device, an engine hood 7, and an operation seat 72. The cooling fan 12a is arranged in front of the engine main body 1, and is configured to feed air to the engine main body 1. The DPF 19 is arranged on the left side of the engine main body 1 and purifies exhaust gas exhausted from the engine main body 1. The engine hood 7 covers the engine main body 1, the cooling fan 12a, and the DPF 19. The operation seat 72 is arranged behind the engine hood 7. An outside air intake port 21 is formed in each of left and right side surface portions 76 of the engine hood 7, at a position further forward than the cooling fan 12a. Further, on the left side surface of the engine hood 7, a first opening 30 capable of exhausting air inside the engine hood 7 in a direction away from the operation seat 72 in side view is formed in a position facing the DPF 19 in the lateral direction.

With this, the air taken into the engine hood 7 through the outside air intake ports 21 is fed rearward by the cooling fan 12a, and flows along the left and right side surfaces of the engine main body 1 and the DPF 19. Therefore, the DPF 19 which tends to have a high temperature can be efficiently cooled. Further, the air having become high temperature air by taking away the heat from the DPF 19 is exhausted outside the engine hood 7 from the first opening 30, in a direction away from the operation seat 72 in side view. Thus, the air having become high temperature is restrained from flowing towards the operation seat 72 behind, and a favorable work environment nearby the operation seat 72 can be maintained.

Further, in the tractor 6 of the present embodiment, a plurality of first fins 33a, each having a slope surface 33b inclined in such a manner as to be further forward as it gets closer to the outside from inside the engine hood 7, are arranged and aligned in the first opening 30.

With this structure, the air having become high temperature air by taking away the heat from the DPF 19 is exhausted in such a manner as to approach the front of the tractor 6 as it gets away from the first opening 30, by passing the first opening 30 along the slope surfaces 33b of the first fins 33a. Thus, the air having become high temperature is reliably restrained from flowing towards the operation seat 72 behind, and a favorable work environment nearby the operation seat 72 can be maintained.

Further, in the tractor 6 of the present embodiment, the fin member 33 is attached to the first opening 30 so that the first fins 33a are aligned in the length direction of the DPF 19.

This way, the air having become high temperature air by taking away the heat from the DPF 19 is efficiently exhausted outside the engine hood 7.

Further, in the tractor 6 of the present embodiment, a second opening 32 having a shape elongated in a vehicle width direction, which is capable of exhausting the air inside the engine hood 7 in a direction away from the operation seat 72 in side view, is formed in a position above the rear of the engine hood 7 and in front of the operation seat 72.

With this structure, an amount of the air which became high temperature air by taking away the heat from the engine main body1 and the DPF 19, and which is not exhausted outside the engine hood 7 from the first opening 30 can be exhausted outside the engine hood 7 from the second opening 32, in a direction away from the operation seat 72. This way, accumulation of heat inside the engine hood 7 can be restrained, the cooling effect can be further improved, and a favorable work environment nearby the operation seat 72 can be maintained.

Further, in the tractor 6 of the present embodiment, a plurality of second fins 34c, each having a slope surface 34d inclined in such a manner as to be further forward as it gets closer to the outside from a middle relative to the vehicle width direction, are arranged and aligned in the second opening 32.

With this structure, an amount of the air which became high temperature air by taking away the heat from the engine main body1 and the DPF 19, and which is not exhausted outside the engine hood 7 from the first opening 30 passes the second opening 32 along the surfaces of the second fins 34c and is exhausted towards the front of the tractor 6, and towards the outside so as to depart from the tractor 6 in the vehicle width direction. Therefore, the work environment nearby the operation seat 72 is further improved.

Although a preferred embodiment of the present invention has been described above, the above-described configuration can be modified, for example, as follows.

The above embodiment deals with a case where the work vehicle is a tractor with or without a cabin. However, the work vehicle is not limited to this, and the structure of the above-described engine hood can be broadly applicable to work vehicles other than the tractors. Further, the work vehicle is not limited to one for agricultural use, and for example, the present invention can be applicable to, for example, tractors and the like for construction work and the like.

In the tractor of the above-described embodiment, the DPF 19 serving as the exhaust gas purification device is arranged on the left side of the engine main body 1. However, the present invention is not limited to this, and instead, the exhaust gas purification device may be disposed on the right side of the engine main body. In this case, the first opening may be formed at a position on the right side surface of the engine hood facing the exhaust gas purification device in the lateral direction.

REFERENCE SIGNS LIST 1 engine main body
6 tractor
7 engine hood
19 DPF (exhaust gas purification device)
30 first opening
72 operation seat

The invention claimed is:

1. A work vehicle comprising:
   an engine main body;
   a cooling fan arranged in front of the engine main body, and configured to feed air to the engine main body;
   an exhaust gas purification device arranged on one of left and right sides of the engine main body, and configured to purify exhaust gas exhausted from the engine main body;
   an engine hood that covers the engine main body, the cooling fan, and the exhaust gas purification device; and
   an operation seat arranged behind the engine hood, wherein
   an outside air intake port is formed in at least one of left and right side surfaces of the engine hood, at a position further forward than the cooling fan,
   on at least one of the left and right side surfaces of the engine hood, a first opening capable of exhausting air inside the engine hood in a direction away from the operation seat in side view is formed in a position facing the exhaust gas purification device in a lateral direction thereof,
   a second opening having a shape elongated in a vehicle width direction is formed in a position above a rear of the engine hood and in front of the operation seat, the second opening being capable of exhausting the air inside the engine hood in a direction away from the operation seat in side view, and
   a closing part is provided in a middle position of the second opening relative to the vehicle width direction, and a direction of the air passing through the second opening is divided into left and right by the closing part.

2. The work vehicle according to claim 1, wherein a plurality of first fins, each having a surface inclined in such a manner as to be further forward as it gets closer to outside from inside of the engine hood, are arranged and aligned in the first opening.

3. The work vehicle according to claim 1, wherein a plurality of second fins, each having a surface inclined in such a manner as to be further forward as it gets closer to outside from a middle relative to the vehicle width direction, are arranged and aligned in the second opening.

4. The work vehicle according to claim 2, wherein a plurality of second fins, each having a surface inclined in such a manner as to be further forward as it gets closer to outside from a middle relative to the vehicle width direction, are arranged and aligned in the second opening.

* * * * *